United States Patent [19]
Matsumura et al.

[11] Patent Number: 5,677,380
[45] Date of Patent: Oct. 14, 1997

[54] PLANARIZING MATERIAL AND PLANARIZING METHOD

[75] Inventors: Kosaburo Matsumura; Mitsumasa Akashi, both of Tokuyama; Yoshitaka Tsutsumi, Kudamatsu; Masazumi Hasegawa, Shinnanyo, all of Japan

[73] Assignee: Tosoh Corporation, Shinnanyo, Japan

[21] Appl. No.: 408,885

[22] Filed: Mar. 24, 1995

Related U.S. Application Data

[63] Continuation of Ser. No. 913,614, Jul. 16, 1992, abandoned.

[30] Foreign Application Priority Data

Jul. 16, 1991 [JP] Japan .................................. 3-199878
Nov. 28, 1991 [JP] Japan .................................. 3-337977

[51] Int. Cl.$^6$ .............................. C08F 8/00; C08L 63/00
[52] U.S. Cl. ...................... 525/107; 528/125; 528/126; 528/127; 525/56; 525/107; 525/132; 525/133; 525/472; 525/480; 525/502; 525/521; 525/534; 525/539; 525/540; 427/340; 427/372.2; 427/385.5; 428/357; 428/423.1
[58] Field of Search .................... 528/125, 126, 528/127; 525/472, 480, 502, 521, 534, 539, 540, 56, 107, 132, 133; 427/340, 372.2, 385.5; 428/357, 423.1

[56] References Cited

U.S. PATENT DOCUMENTS

| 3,980,602 | 9/1976 | Jakubauskas | 260/29.6 |
| 4,983,545 | 1/1991 | Gokan et al. | |
| 5,212,046 | 5/1993 | Lamola et al. | 430/270 |

FOREIGN PATENT DOCUMENTS

| 54014437 | 2/1979 | Japan . |
| 1-142606 | 6/1989 | Japan . |
| 3-8652 | 2/1991 | Japan . |
| 3-81122 | 12/1991 | Japan . |
| 4-12301 | 1/1992 | Japan . |
| 4-132729 | 5/1992 | Japan . |
| 4-133001 | 5/1992 | Japan . |
| 4-133002 | 5/1992 | Japan . |
| 5320579 | 12/1993 | Japan . |

*Primary Examiner*—Samuel A. Acquah
*Attorney, Agent, or Firm*—Oblon, Spivak, McClelland, Maier & Neustadt, P.C.

[57] ABSTRACT

A planarizing material comprising a resin capable of having its practical temperature for a planarizing step set at a level lower than 200° C., and a melamine-type heat-curing agent and/or an epoxy-type heat-curing agent.

20 Claims, 8 Drawing Sheets

PLANARIZING MATERIAL AND PLANARIZING METHOD

This application is a Continuation of application Ser. No. 07/913,614, filed on Jul. 16, 1992, now abandoned.

BACKGROUND OF THE INVENTION

1. Field of the Invention The present invention relates to a planarizing material and a planarizing method useful for the production of charge coupled devices, liquid crystal display devices and semiconductor integrated circuits devices. More particularly, it relates to a planarizing material which is capable of presenting a high level of flatness and which satisfies the requirements for excellent heat durability, solvent resistance and transparency, and a planarizing method which is capable of providing a high level of flatness by a simple operation in a step of planarizing a substrate having surface irregularities.

2. Discussion of Background

Each of the processes for producing charge coupled devices, liquid crystal display devices and semiconductor integrated circuit devices includes a step of multi-layering by lamination of elements although the purpose may be different. Therefore, the technique for flattening or planarizing a substrate having surface irregularities is a technically important subject common to the respective processes.

A solid-state image pick-up device has a structure wherein two or three color filter layers are laminated on an element having a photodiode formed on a silicon substrate, and a surface protective film is further formed thereon. For high densification of picture elements of a solid-state image pick-up device, it is required that color filter layers having the size and shape controlled to a high level are formed and laminated at a high density. In an on-chip method which has been most commonly employed recently, planarization of an element as the lowermost layer and planarization of the respective color filter layers are essential and constitute very important steps for the production.

In the case of a liquid crystal display device, a color filter layer, a protective film layer, an ITO film and an orientation film are sequentially formed on a transparent substrate to form a colored liquid display device. However, if there exists a stepped portion in the colored liquid crystal device thus prepared, when a liquid crystal compound is sandwiched between a pair of the transparent substrates, there will be a difference (irregularities) in the thickness of the liquid crystal between the pair of the substrates. As a result, there will be a color fading phenomenon or the like due to retardation or orientation failure of the liquid crystal. Accordingly, also in the field for the production of liquid crystal display devices, planarization of the respective layers is a technically important subject.

Further, in the production of a semiconductor integrated circuit device, it is required to sequentially laminate an insulating layer and a conductive layer from its structural nature as is well known. However, in recent years, as the number of conductive layers has increased to two or three layers, the level difference of the conductive layers has become acute, whereby disconnection, short circuitting or the like is likely to result at intersections of conductive layers and thus makes the laminated structure substantially difficult. Therefore, it is essential to level the surface of the insulating layer prior to forming a conductive layer in order to prevent such disconnection, short circuitting or the like. Thus, establishment of a planarizing technique is an important subject also in this filed.

The following various methods have been proposed to solve problems in such a planarizing step common to various fields.

1) A method in which as a planarizing layer on a stepped portion, a polyglycidyl methacrylate (PGMA) type or a modified PGMA type which is usually transparent in a visible light region and which is curable by heat or light, is used.

2) A plasma etching method used in the field of the production of liquid crystal display devices, wherein a planarizing material is flattened by plasma etching (Japanese Unexamined Patent Publication No. 147232/1986). 3) A method wherein a material having a relatively low heat deformation temperature such as polystyrene or its derivative having a molecular weight of about 10,000, is spin-coated on a stepped portion and heated to a temperature higher than the heat deformation temperature (e.g. 200° C.) to let the material flow to form a planarized organic resin surface, which is then cured by ultraviolet rays, and further subjected to dry etching to obtain a flat surface (Japanese Unexamined Patent Publication No. 225526/1984). 4) A method wherein the ultraviolet curing step in the above-mentioned method can be simplified by conducting heat-curing by means of a polymer having a low molecular weight having heat-curable functional groups introduced therein (Japanese Unexamined Patent Publication No. 227407/1990).

On the other hand, reflecting high densification of picture elemnts and high integration of devices in recent years, an attention has been drawn to a halation-preventing technique as an important function required for the material, as well as such a planarizing technique. Each of the processes for the production of the above-mentioned devices, include a step of applying fine working on a laminated planarized material by means of photolithography. The halation means spreading of light caused by reflection from a substrate, which takes place in such a photolithography step, for example, when the substrate has a glossy metal portion (such as aluminum, chromium, platinum or nickel). At the site where such halation (spread of light) has taken place, the region of a photosensitive material where no sensitization is desired, is sensitized, thus leading to a problem that the resolution will be remarkably impaired. Accordingly, in the photolithography step in the field of the production of a highly densified picture element device or a highly integrated device where a high level of resolution is required, a certain measure is required against halation in such a photolithography step. To solve such problems of halation, the following methods have been proposed.

1) In a process for the production of semiconductors, a method of directly incorporating to a photosensitive material, a light-absorbing agent capable of absorbing a certain specific wavelength corresponding to the wavelength for exposure, such as an organic dye as a halation-preventive agent (Japanese Unexamined Patent Publication No. 37562/1976).

2) In the field of the production of charge coupled devices and liquid crystal display devices, a method of forming a layer having a halation-preventive agent incorporated, as a planarizing layer beneath a color filter layer (Japanese Unexamined Patent Publication No. 142606/1989).

3) Also in the field of the production of charge coupled devices and liquid crystal display devices, a method of using a polymer light-absorbing agent or oligomer light-absorbing agent, having a light-absorbing agent capable of absorbing light of a certain specific wavelength corresponding to the wavelength for exposure incorporated as a halation-preventive agent to a polymer or oligomer.

With respect to the above-mentioned methods for planarization, however, in the case where an organic substance is spin-coated as in the method 1), it is usually very difficult to form a uniform coating film over the irregularities on the substrate and to completely level the surface of the substrate. Accordingly, it is presently common to adopt a method in which the viscosity of the planarizing material is controlled by reducing the concentration of the resin or reducing the molecular weight. However, by such a method, it is difficult to obtain a sufficient film thickness for planarization or to obtain a satisfactory film quality uniformly. Further, reflecting the requirements in recent years for high densification in each of charge coupled devices, liquid crystal display devices and semiconductor integrated circuit devices, it is required by a planarizing process to completely fill a planarizing material into fine spaces between elements, and such an operation will be difficult by this method. The method 2) requires an etching step and thus has a problem that the process will be cumbersome and the productivity is poor. The method 3) has a problem that when applied to a production process, this method requires cumbersome steps such as a ultraviolet curing step and an etching step, and thus the productivity is poor. Further, to attain adequate flatness by the planarizing step of heating and fluidizing a resin, heating at a high temperature of a level of 200° C. is required. Therefore, it is likely to bring about an adverse effect such as deterioration of the transparency of a color filter or discoloration of the dye especially in the cases of a solid-state image pick-up device or a liquid crystal display device. Therefore, this method has a problem that it is hardly applicable to such a field. The method 4) requires a long period of time for planarization by heating and fluidizing. Besides, it requires a heat-curing step at a high temperature, separate from the planarizing step by heating and fluidizing, and thus has a problem that the process is cumbersome, and the productivity is poor. Further, also in this method, a high temperature is required in a step of heating and fluidizing the planarizing material or in the heat-curing step, and thus it is difficult to apply this method to a field of the production of charge coupled devices or liquid crystal display devices. On the other hand, with respect to the halation-preventing technology, the method 1) may be useful for the process for the production of semiconductor integrated circuit devices, but in the production of charge coupled devices and liquid crystal display devices where a natural protein is employed as a coloring base material for a color filter, a method of directly incorporating an organic dye to the color filter is not desirable from the nature of the color filter, and it is difficult to apply this method to such a field. In the method 2), most of the halation-preventive agent is likely to be evaporated or sublimed due to the heat applied in the curing step of the planarizing layer, whereby the expected effects can not adequately be obtained. Further, also by the method 3) proposed for the purpose of suppressing such evaporation or sublimation, the halation-preventive agent has a difficulty in the compatibility with the base polymer for the planarizing material or with the curing agent, and thus, this method also has a problem that it is difficult to directly incorporate the halation-preventive agent to the polymer or the oligomer.

Thus, heretofore, there has been no material which fully satisfies basic properties such as heat durability, solvent resistance and transparency required for charge coupled devices, liquid crystal display devices and semiconductor integrated circuit devices, respectively, and which has a high level of a planarizing property and is applicable to all the fields of producing charge coupled devices, liquid crystal display devices and semiconductor integrated circuit devices. Likewise, there has been no planarizing method which provides a high level of flatness by a simple and efficient step.

SUMMARY OF THE INVENTION

The present invention has been made in view of the above problems, and it is an object of the present invention to provide a planarizing material which presents a high level of flatness to a substrate having surface irregularities in a planarizing process, which is an important technical subject common to the production of charge coupled devices, liquid crystal display devices and semiconductor integrated circuit devices and which satisfies the basic properties such as heat durability, solvent resistance and transparency required for such devices and is applicable to all of the above-mentioned fields.

It is another object of the present invention to provide a planarizing material having a function to effectively prevent halation.

A further object of the present invention is to provide a planarizing method, whereby various post-treatment steps required by conventional methods can be omitted so that the cumbersomeness of the process can be reduced and the productivity can be improved.

The present inventors have conducted extensive researches to attain the above objects. As a result, they have found that a high level of flatness can be obtained by a simple process by using a planarizing material comprising, as the basic constituents, a resin capable of having its practical temperature for a planarizing step set at a level lower than 200° C. and a heat-curing agent and if necessary, by adding a prescribed halation-preventive agent and/or a curing catalyst to the planarizing material. Further, they have found that when the halation-preventive agent or the curing catalyst to be incorporated has a functional group reactive for an addition reaction with at least one of said resin, said heat-curing agent, said halation-preventive agent and said curing catalyst, the evaporation, sublimation or migration during the heating can almost completely be prevented, and a high level of effects can be obtained by incorporation of a small amount of the halation-preventive agent or the curing catalyst. The present invention has been accomplished on the basis of these discoveries.

The present invention provides a planarizing material comprising a resin capable of having its practical temperature for a planarizing step set at a level lower than 200° C., and a melamine-type heat-curing agent and/or an epoxy-type heat-curing agent.

DETAILED DESCRIPTION OF THE PREFERRED EMBODIMENTS

Figure 1:
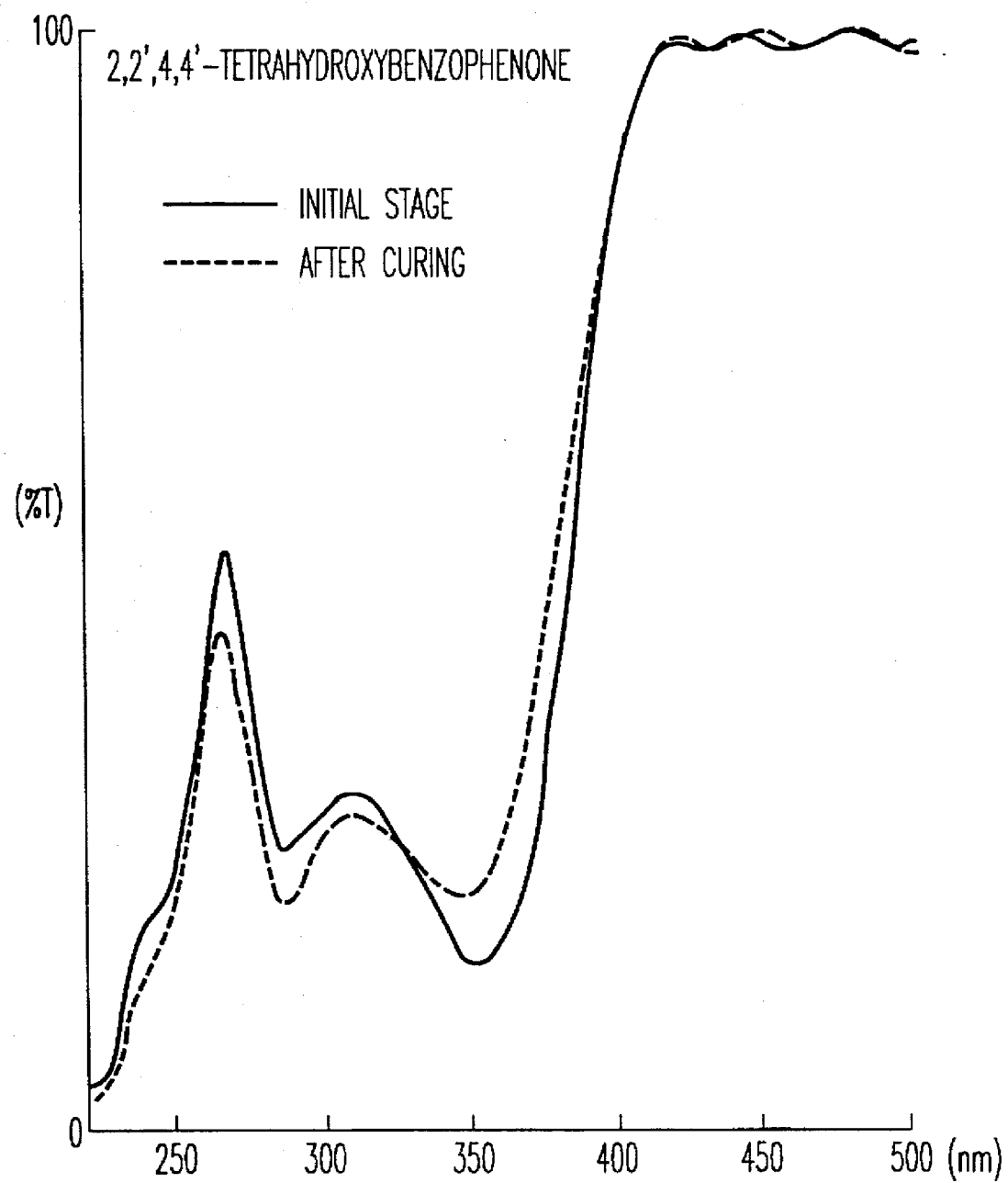
FIG. 1 is a graph showing spectral characteristics of the planarized film formed in Example 17 wherein 2,2', 4,4'-tetrahydroxybenzophenone was used as a halation-preventive agent.

Now, the present invention will be described in detail.

The resin capable of having its practical temperature for a planarizing step set at a level lower than 200° C. may, for example, be an acrylic resin, a styrene resin, or a polyvinyl alcohol or its derivative, which can be obtained by adjusting the glass transition temperature (TG) or the molecular weight of the resin. Among them, an acrylic resin is preferred for a reason such that various properties such as transparency and heat durability of the cured coating film are excellent, which are important especially in the filed of producing charge coupled devices and liquid crystal display devices. Further, an acrylic resin comprising structural units of the following formula (1), is preferred, since it has a functional group reactive with a heat-curing agent for an effective crosslinking reaction:

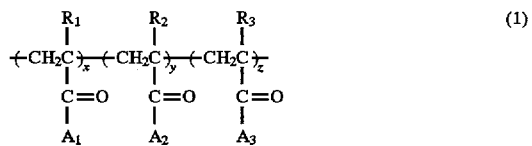

wherein each of $R_1$, $R_2$ and $R_3$ is hydrogen or a methyl group, each of $A_1$, $A_2$ and $A_3$ is $OB_1$ or $NB_2B_3$, wherein each of $B_1$, $B_2$ and $B_3$ is hydrogen, a $C_{1-6}$ alkyl, alkenyl or hydroxyalkyl group, a $C_{2-12}$ epoxy group, a $C_{6-12}$ aryl group or a $C_{7-12}$ aralkyl group, and each of x, y and z is a positive number inclusive of 0 and they satisfy the following formulas:

$$0 \leq x/(x+y+z) \leq 1$$

$$0 \leq y/(x+y+z) \leq 1$$

$$0 \leq z/(x+y+z) \leq 1$$

In the above formula, the alkyl group for $B_1$ to $B_3$ may, for example, be a methyl group, an ethyl group, a n-propyl group, an isopropyl group, a n-butyl group, an isobutyl group, a t-butyl group, a n-amyl group, an isoamyl group, a n-hexyl group or a cyclohexyl group; the epoxy group may, for example, be a glycidylepoxy group such as an ethylenoxide group or a propylenoxide group, or an alicyclic epoxy group such as a cyclohexenoxide group, a cyclopentenoxide group or a tricyclodecenoxide group; the aryl group may, for example, be a phenyl group, a tolyl group, a xylyl group, an ethylphenyl group or a naphthyl group and some of hydrogen atoms on an aromatic ring in the aryl group may be substituted by e.g. a halogen atom such as chlorine or bromine, a nitro group or a cyano group. Further, the aralkyl group may, for example, be a benzyl group or a phenetyl group, and some of hydrogen atoms on an aromatic ring of the aralkyl group may be substituted by e.g. a halogen atom such as chlroine or bromine, a nitro group or a cyano group.

Here, a planarizing step means a step of heat-curing as well as heating and fluidizing after coating a prescribed planarizing material to form a film on a substrate having surface irrefuralities.

With the planarizing material in the present invention, the fluidity under heating of the resin capable of having its practical temperature required for a planarizing step set at a level lower than 200° C., varies depending upon the configuration and the size of the stepped portion to be planarized. The fluidity under heating of this resin can be adjusted by controlling the glass transition temperature (Tg) of the respective components constituting the resin and the molecular weight of the resin.

Accordingly, the molecular weight of the resin capable of having its practical temperature for a planarizing step set at a level lower than 200° C., is not particularly limited, in the present invention. For example, the molecular weight may be within a range of from a few hundred to about 500,000. However, taking into consideration the physical properties such as heat durability and solvent resistance of the cured coating film and preferred temperature and time for heating and fluidizing, the molecular weight is preferably from 1,000 to 100,000. Further, at a site where stricter flatness is required, the molecular weight is particularly preferably from 1,000 to 50,000 in order to obtain good fluidity under heating of the resin, while maintaining the desired physical properties of the cured coating film.

In the present invention, the resin capable of having its practical temperature for a planarizing step set at a level lower than 200° C., can be obtained by selecting a monomer from e.g. (meth)acrylic acid, and a (meth)acrylate, (meth)acrylamide, an N-substituted (meth)acrylamide and styrene taking the glass transition temperature of the obtained resin into consideration and by solution radical (co)polymerizing the polymer in accordance with a conventional method while controlling the molecular weight. For the planarizing material in the present invention, it is necessary to employ a melamine-type heat-curing agent and/or an epoxy-type heat-curing agent in order to impart various physical properties to the cured film such as solvent resistance and cracking durability required in the field of producing the respective devices.

The melamine-type heat-curing agent may, for example, be methylolmelamine, a partially alkyl-etherified melamine, a completely alkyl-etherified melamine, a partially alkyl-etherified benzoguanamine, a completely alkyl-etherified benzoguanamine, a mixed alkyl-etherified melamine or mixed alkyl-etherified benzoguanamine having a plurality of alkyl groups introduced at optional proportions. Especially when the resin capable of having its practical temperature for a planarizing step set at a level lower than 200° C., is an acrylic resin comprising structural units of the formula (1), it is preferred to employ a melamine-type heat-curing agent comprising structural units of the following formula (2) in order to improve the compatibility and the curing reactivity with the acrylic resin:

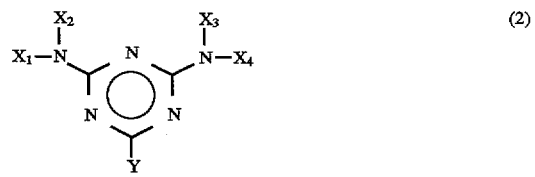

wherein Y is $—NX_5X_6$ or a phenyl group, and each of $X_1$ to $X_6$ is hydrogen or $—CH_2OZ$, wherein Z is hydrogen or a $C_{1-5}$ alkyl group.

The alkyl group for Z in the above formula may, for example, be a methyl group, an ethyl group, a n-propyl group, an isopropyl group, a n-butyl group, an isobutyl group, a t-butyl group, a n-amyl group or an isoamyl group.

The melamine-type heat-curing agent comprising the structural units of the formula (2) includes, for example, a methylolmelamine such as trimethylolmelamine or hexamethylolmelamine, a partially alkyl-etherified melamine such as trimethoxymethylmelamine, tripropoxymethylmelamine or tributoxymethylmelamine, a completely alkyl-etherified melamine such as hexamethoxymethylmelamine, hexapropoxymethylmelamine or hexabutoxymethylmelamine, a partially alkyl-etherified benzoguanamine such as dimethoxymethylbenzoguanamine or dibutoxymethylbenzoguanamine, a completely alkyl-etherified benzoguanamine such as tetramethoxymethylbenzoguanamine or tetrabutoxymethylbenzoguanmine, and a mixed alkyl-etherified melamine or mixed alkyl-etherified guanamine having a plurality of alkyl groups such as a methyl group and a butyl group introduced at optional proportions into melamine or guanamine.

The epoxy-type heat-curing agent is not particularly restricted, so long as it is an epoxy-type heat-curing agent composed of one or more compounds having at least one epoxy group, on average, per molecule. For example, a glycidyl ether type may, for example, be n-butylglycidyl ether, 2-ethoxyhexylglycidyl ether, phenylglycidyl ether, allylglycidyl ether, ethylene glycol diglycidyl ether, propylene glycol diglycidyl ether, neopentyl glycol diglycidyl ether, glycerol polyglycidyl ether or sorbitol polyglycidyl ether; a glycidyl ester type may, for example, be diglycidyl adipate or diglycidyl o-phthalate; and an arycyclic epoxy may, for example, be 3,4-epoxycyclohexylmethyl(4,3-epoxycyclohexane) carboxylate, 3,4-epoxy-6-methylcyclohexylmethyl-3,4-epoxy-6-methylcyclohexane carboxylate, bis(3,4-epoxy-6-methylcyclohexylmethy) adipate, dicyclopentadiene oxide or bis(2,3-epoxycyclopentyl) ether.

When the melamine-type heat-curing agent and the epoxy-type heat-curing agent are used in combination as the heat-curing agent, the above-mentioned melamine-type heat-curing agents and the epoxy-type heat-curing agents may be used in suitable combinations.

When a halation-preventing function is required for the planarizing material in the present invention, a halation-preventive agent may be further added to the planarizing material. Namely, the planarizing material having a halation-preventing function comprises the resin capable of having its practical temperature for a planarizing step set at a level lower than 200° C., the heat-curing agent and the halation-preventive agent. Here, the halation-preventive agent to be incorporated, is not particularly restricted so long as it is a compound capable of absorbing light of the light source for exposure, and an appropriate halation-preventive agent may be selected for use depending upon the particular purpose. For example, compounds of benzophenone type, triazole type, salicylate type, cyanoacrylate type, hindered amine type, chalcone type, cinnamic acid type, azo type, stilbene type and stilbazole type, may be mentioned. Specifically, the benzophenone type may, for example, be 2-hydroxy-4-methoxybenzophenone, 2-hydroxy-4-octyloxybenzophenone, 2-hydroxy-4-n-dodecyloxybenzophenone, 2-hydroxy-4-benzyloxybenzophenone, 2,2'-dihydroxy-4-methoxybenzophenone, 2-hydroxy-4-methoxybenzophenone-5-sulfonic acid or its salt, or 2,2'-dihydroxy-4,4'-dimethoxybenzophenone-5,5'-disulfonic acid or its salt. The triazole type may, for example, be 2-(2'-hydroxy-5'-methylphenyl)benzotriazole, 2-(2'-hydroxy-3'-t-butyl-5'-methylphenyl)-5-chlorobenzotriazole, 2-(2'-hydroxy-3', 5'-di-t-butylphenyl)benzotriazole or 2-[2'-hydroxy-3', 5'-bis(e,e'-dimethylbenzyl)phenyl]-2H-benzotriazole. The salicylate type may, for example, be 2,4-di-t-butylphenyl-3', 5'-di-t-butyl-4'-hydroxybenzoate, 4-t-butylphenyl salicylate, phenyl salicylate or 4-t-octylphenyl salicylate. The cyano acrylate type may, for example, be ethyl-2-cyano-3,3-diphenyl acrylate or 2-ethylhexyl-2-cyano-3,3-diphenyl acrylate. The hindered amine type may, for example, a condensation product of N,N'-bis(3-aminopropyl)ethylenediamine with 2,4-bis[N-butyl-N-(1,2,2,6,6-pentamethyl-4-piperidyl)amino]-6-chloro-1,3,5-triazine, succinic acid-bis(2,2,6,6-tetramethyl-4-piperidinyl) ester or 2-(3,5-di-t-butyl-4-hydroxybenzyl)-2-n-butylmalonate bis(1,2,2,6,6-pentamethyl-4-piperidyl). The chalcone type may, for example, be 2'-hydroxychalcone. The cinnamic acid type may, for example, be an ester of trans-o-methoxycinnamic acid, an ester of m-methoxycinnamic acid, an ester of p-methoxycinnamic acid, or an ester of α-cyanocinnamic acid. The azo type may, for example, be p-(N,N-dimethylamino)azobenzene, 2,4-bis(N,N-dimethylamino) azobenzene or 4,4'-bis(N,N-dimethylamino)azobenzene. The stilbene type may, for example, be 4,4'-bis(5-methylbenzoxazol-2-yl)stilbene, 1,4-bis(2-methylstyryl) benzene, p-(dimethylamino)stilbene, 4-methoxy-4'-nitrostilbene or tetraphenylethylene. The stilbazole type may, for example, be 4-(3', 4'-dimethoxystyryl)pyridine, 2-(3', 4'-dimethoxystyryl)pyridine, 4-(3', 4'-dimethoxystyryl)quinoline, 4-(3'-methoxy-4'-ethoxystyryl)quinoline, 2-(3'-methoxy-4'-ethoxystyryl) quinoline, 2-(3', 4'-dimethoxystyryl) thiazole, 2-(3'-methoxy-4'-ethoxystyryl) thiazole or 2-(3'-methoxy-4'-ethoxystyryl) oxazole.

When a halation-preventive agent is simply added to the planarizing material, an extra amount of the agent corresponding to the amount which will be evaporated and sublimed during the heating and fluidizing of the planarizing material, may additionally be added beforehand, or for the purpose of preventing such evaporation or sublimation, a certain adjustment may be applied to the heating process, for example, be prolonging the temperature raising time to a prescribed heating temperature.

On the other hand, it is preferred to employ a specific compound having a functional group reactive for an addition reaction with at least one of the resin capable of having its practical temperature for a planarizing step set at a level lower than 200° C., the heat-curing agent and the halation-preventive agent, as the halation-preventive agent, so that evaporation or sublimation of the halation-preventive agent during the heating and fluidizing of the planarizing material, can be prevented, and the object can adequately be attained by an addition of a small amount of the halation-preventive agent.

When the halation-preventive agent is the one having a functional group reactive for an addition reaction with at least one of the resin, the heat-curing agent and the halation-preventive agent, it is preferred to employ an acrylic resin as the resin capable of having its practical temperature for a planarizing step set at a level lower than 200° C., for a reason such that various properties such as transparency and heat durability of the cured coating film, which are important particularly in the field of the production of charge coupled devices and liquid crystal display devices, are excellent.

Further, it is more preferred to employ an acrylic resin having structural units of the following formula (3) or (4) having a functional group which is reactive with the heat-curing agent for an effective crosslinking reaction and which is also reactive with the halation-preventive agent for an effective addition reaction:

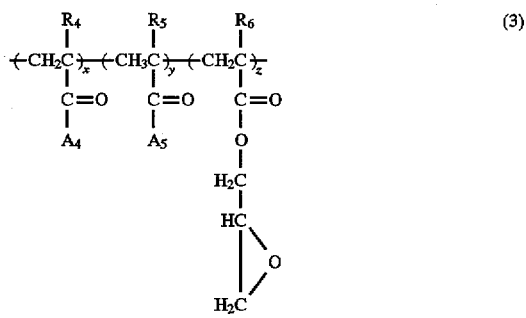

wherein each of $R_4$, $R_5$ and $R_6$ is hydrogen or a methyl group, and each of $A_4$ and $A_5$ is $OB_4$ or $NB_5B_6$, wherein each of $B_4$, $B_5$ and $B_6$ is hydrogen, a $C_{1-6}$ alkyl, alkenyl or hydroxyalkyl group, a $C_{2-12}$ epoxy group, a $C_{6-12}$ aryl group or a $C_{7-12}$ aralkyl group, and each of x, y and z is a positive number inclusive of 0 and they satisfy the following formulas:

$0 \leq x/(x+y+z) \leq 1$ $0 \leq y/(x+y+z) \leq 1$ $0 \leq z/(x+y+z) \leq 1$

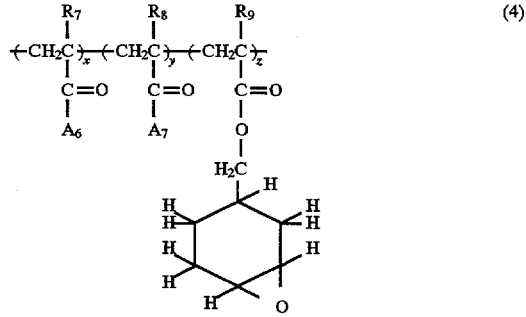

wherein each of $R_7$, $R_8$ and $R_9$ is hydrogen or a methyl group, each of $A_6$ and $A_7$ is $OB_7$ or $NB_8B_9$, wherein each of $B_7$, $B_8$ and $B_9$ is hydrogen, a $C_{1-6}$ alkyl, alkenyl or hydroxyalkyl group, a $C_{2-12}$ epoxy group, a $C_{6-12}$ aryl group or a $C_{7-12}$ aralkyl group, and each of x, y and z is a positive number inclusive of 0 and they satisfy the following formulas:

$0 \leq x/(x+y+z) \leq 1$ $0 \leq y/(x+y+z) \leq 1$ $0 \leq z/(x+y+z) \leq 1$

The alkyl group for $B_4$ to $B_9$ in the above two formulas may, for example, be a methyl group, an ethyl group, a n-propyl group, an isopropyl group, a n-butyl group, an isobutyl group, a t-butyl group, a n-amyl group, an isoamyl group, a n-hexyl group and a cyclohexyl group; the epoxy group may, for example, be a glycidyl epoxy group such as an ethylenoxide group or a propylenoxide group, or an alicyclic epoxy group such as a cyclohexenoxide group, a cyclopentenoxide group or a tricyclodecenoxide group; and the aryl group may, for example, be a phenyl group, a tolyl group, a xylyl group, an ethylphenyl group or a naphthyl group, and some hydrogen atoms on an aromatic ring in the aryl group may be substituted by e.g. a halogen atom such as chlorine or bromine, a nitro group or a cyano group. The aralkyl group may, for example, be a benzyl group or a phenetyl group, and some hydrogen atoms on an aromatic ring of the aralkyl group may be substituted by e.g. a halogen atom such as chlorine or bromine, a nitro group or a cyano group.

The halation-preventive agent having a functional group which undergoes an addition reaction under heating, includes, for example, compounds of benzophenone type, salicylate type, cyano acrylate type, chalcone type, cinnamic acid type, azo type, stilbene type and stilbazole type. The functional group reactive for an addition reaction with at least one of the resins, etc., may, for example, be an alcoholic hydroxyl group, a phenolic hydroxyl group, an organic acid, an acid anhydride, a primary amine, a secondary amine, an epoxy group or an aldehyde group. As specific examples of such a halation-preventive agent, the benzophenone type may, for example, be 2,4-dihydroxybenzophenone, 2,3,4-trihydroxybenzophenone, 2,4,6-trihydroxybenzophenone, 2,4,4'-trihydroxybenzophenone, 2,3,4,4'-tetrahydroxybenzophenone, 2,2', 4,4'-tetrahydroxybenzophenone, 2,3,3', 4,4'-pentahydroxybenzophenone, 2,3,3', 4,4', 5'-hexahydroxybenzophenone or partially oxidized derivatives of these benzophenone compounds. The salicylate type may, for example, be 4-hydroxynaphthyl salicylate. The cyano acrylate type may, for example, be ethyl-2-cyano-3, 3-bis(4'-hydroxydiphenyl) acrylate. The chalcone type may, for example, be 2-hydroxychalcone, 4-hydroxychalcone or 4'-hydroxychalcone. The cinnamic acid type may, for example, be o-chlorocinnamic acid, α-cyanocinnamic acid, p-aminocinnamic acid, 3,4-dihydroxycinnamic acid or 3,4-dimethoxycinnamic acid. The azo type may, for example, be o-toluene-azo-o-toluidine, p-aminoazobenzene and 2,4-diaminoazobenzene. The stilbene type may, for example, be 4-amino-4'-(N,N-dimethylamino)stilbene or 4-amino-4'-methoxystilbene. The stibazole type may, for example, be 4-(4'-hydroxystyryl)pyridine, 4-(3'-methoxy-4'-hydroxystyryl)pyridine, 2-(3'-methoxy-4'-hydroxystyryl)pyridine, 4-(3'-methoxy-4'-hydroxystyryl)quinoline, 2-(4'-formylstyryl)pyridine, 4-(4'-formylstyryl)pyridine, 2-(4'-formylstyryl)quinoline, 4-(4'-formylsiryl)quinoline, 2-(4'-carboxystyryl)quinoline, 4-(4'-carboxystyryl)quinoline, 2-(4'-carboxystyryl)pyridine or 4-(4'-carboxystyryl) pyridine.

Among these compounds, benzophenone-type compounds are preferred, since they satisfy the requirements for excellent compatibility with the resin and excellent transparency of the cured coating film in a visible light region, which are important in the field of the production of charge coupled devices and liquid crystal display devices. When the resin capable of having its practical temperature for a planarizing step set at a level lower than 200° C., is an acrylic resin comprising structural units of the formula (3) or (4), it is particularly preferred to employ a benzophenone-type halation-preventive agent comprising structural units of the following formula (5), which has a functional group capable of undergoing an addition reaction effectively under heating and which has a high absorption coefficient in an ultraviolet region and serves as a cocatalyst during the heat-curing operation:

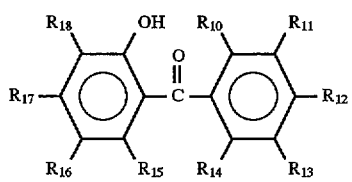

(5)

wherein each of $R_{10}$ to $R_{18}$ is hydrogen or —OW, wherein W is hydrogen or a $C_{1-5}$ alkyl group, provided that at least one of $R_{10}$ to $R_{18}$ is —OH.

Further, a benzophenone-type halation-preventive agent comprising structural units of the following formula (7), which has —OH at the 2- and 2'-positions, is particularly preferred, since such an agent has a strong absorption in the vicinity of 365 nm in the ultraviolet region, which is particularly effective for preventing halation in the lithographic process using an i-line light source:

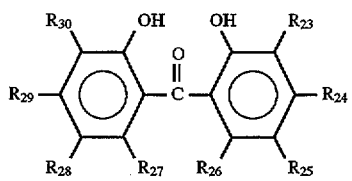

(7)

wherein each of $R_{23}$ to $R_{30}$ is hydrogen or —OW, wherein W is hydrogen or a $C_{1-5}$ alkyl group, provided that at least one of $R_{23}$ to $R_{30}$ is —OH.

When the resin capable of having its practical temperature for a planarizing step set at a level lower than 200° C., is an acrylic resin, the —OH group present at the 2-position (or 2'-position) of the benzophenone-type compound, is essential to impart excellent light absorbing properties. Further, the —OH group present at a position other than the 2-position (or 2- and 2'-positions), is essential for the effective addition reaction with an acrylic resin comprising structural units of the formula (3) or (4), or with the heat-curing agent comprising structural units of the formula (2).

In the present invention, a curing catalyst may further be incorporated to shorten the time or to change the temperature for the curing operation, so that the curing conditions may properly be selected depending upon the process for the production of the particular device.

The curing catalyst to be used in the present invention is not particularly restricted so long as it does not impair the required functions, and it may, for example, be an aliphatic acid anhydride, an alicyclic acid anhydride, an aromatic acid anhydride, a halogenated acid anhydride, a polybasic carboxylic acid, a photocatalytically acid-generating agent, a thermally acid-generating agent, an amine compound or a polyamine compound. Specifically, the aliphatic acid anhydride may, for example, be polyadipic anhydride, polyazelaic anhydride, polysebasic anhydride or poly (ethyloctadecanoic) anhydride. The alicyclic anhydride may, for example, be methyltetrahydrophthalic anhydride, methylhexahydrophthalic anhydride, methylhimic anhydride, hexahydrophthalic anhydride, tetrahydrophthalic anhydride, a trialkyltetrahydrophthalic anhydride or methylcyclohexenedicarboxylic anhydride. The aromatic acid anhydride may, for example, be phthalic anhydride, trimellitic anhydride, pyromellitic anhydride, benzophenonetricarboxylic anhydride, benzophenonetetracarboxylic anhydride, ethylene glycol bistrimellitate or glycerol tristrimellitate. The halogenated acid anhydride may, for example, be chlorendic anhydride or tetrabromophthalic anhydride. The polybasic carboxylic acid may, for example, an alicyclic acid anhydride, an aromatic acid anhydride, a hydrolyzate of halogenated anhydride, succinic acid, glutaric acid, adipic acid, butanetetracarboxylic acid, maleic acid, malonic acid, itaconic acid, 1,2,4-cyclohexanetricarboxylic acid, cyclopentanetetracarboxylic acid or 1,4,5,8-naphthalenetetracarboxylic acid. The amine compound and the polyamine compound may, for example, be an aliphatic amine (primary, secondary or tertiary), an aromatic amine (primary, secondary or tertiary), various modified amine compounds, an imidazole compound, an aliphatic polyamine or an aromatic polyamine. With respect to specific examples of such an amine compound and a polyamine compound, the aliphatic amine may, for example, be ethylenediamine, 1,3-diaminopropane, 1,4-diaminobutane, hexamethylenediamine, 2,5-dimethylhexamethylenediamine, piperidine, pyrrolidine, triethylenediamine, trimethylhexamethylenediamine, dimethylcyclohexylamine, tetramethylguanidine, triethanolamine, N,N'-dimethylpiperadine, dicyanamide or its derivative. The aromatic amine may, for example, be metaphenylenediamine, diaminodiphenylmethane, diaminodiphenylsulfone, diaminodiethyldiphenylmethane, benzyldimethylamine, dimethylamino-p-cresol, 2-(dimethylaminedimethyl)phenol, 2,4,6-tris (dimethylaminomethyl)phenol, pyridine, picoline, DBU (1,8-diazabicyclo(5,4,0)undecene-1) or a tri-2-ethylhexyl acid salt of 2,4,6-tris(dimethylaminomethyl)phenol. The modified amine compound may, for example, be an amine adduct such as a polyamine-epoxy resin adduct or a polyamine-ethylene oxide adduct, a Lewis acid-amine complex such as a boron-trifluoride-amine complex, cyanoethylated polyamine, kerimine, dicyanamide or its derivative, or an organic acid hydrazide. The imidazole compound may, for example, be 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium-trimellitate, 2-methylimidazolium-isocyanulate, 2-phenylimidazolium-isocyanulate, 2,4-diamino-6-[methylimidazolyl-(1)]-ethyl-S-triazine, 2,4-diamino-6-[2-ethylimidazolyl-(1)]-ethyl-S-triazine, 2,4-diamino-6-[2-undecylimidazolyl-(1)]-ethyl-S-triazine, 2-phenyl-4,5-dihydroxymethylimidazole, 2-phenyl-4-methyl-5-hydroxymethylimidazole or 1-cyanoethyl-2-phenyl-4,5-di (cyanoethoxymethyl)imidazole. The aliphatic polyamine may, for example, be diethylenetriamine, iminobispropylamine, bis(hexamethylene)triamine, triethyltetramine, tetraethylenepentamine, pentaethylenehexamine, dimethylaminopropylamine, diethylaminopropylamine, N-aminoethylpiperadine, menthenediamine, isofluorodiamine, bis(4-amino-3-methylcyclohexyl)methane or diaminodicyclohexylamine. The aromatic polyamine may, for example, be m-xylenediamine, xylylenediamine, a xylylenediamine derivative or a xylylenediamine trimer. Except for some special curing catalyst, when curing catalysts mentioned here will be employed, they may preferably be stored under a cool temperature condition to maintain the storage stability. Further, it is preferred to employ a curing catalyst which provides a catalytic activity when decomposed under heating and which has a functional group reactive for an addition reaction with at least one of the resin capable of having its practical temperature for a planarizing step set at a level lower than 200° C., the heat-curing agent, the halation-preventive agent and the curing catalyst, as the curing catalyst, since it is thereby possible to prevent the evaporation or sublimation of the catalyst which is likely to take place during the heating and fluidizing or to prevent a deterioration of the commercial product due to migration which takes place by a heat history after assembled in the commercial product.

The functional group reactive for an addition reaction with at least one of the resin, etc., may, for example, be an alcoholic hydroxyl group, a phenoic hydroxyl group, an organic acid, an acid anhydride, a primary amine, a secondary amine, an epoxy group or an aldehyde group.

Here, as the curing catalyst, it is particularly preferred to use an aromatic amine of the following formula (6) or a COOH group-containing acid anhydride alone or in combination, which has a good balance of the planarization by heating and fluidizing and the activity of the curing reaction and is able to prevent evaporation, sublimation and migration and which is able to improve the storage stability of the planarizing material in a solution state, whereby no substantial deterioration of the material will be brought about even when left to stand at room temperature for a long period of time and simple and mild process conditions can be set:

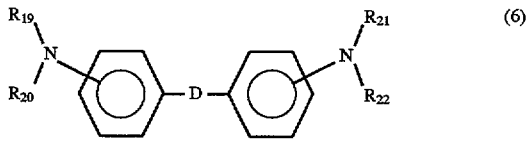

wherein each of $R_{19}$ to $R_{22}$ is hydrogen or a $C_{1-5}$ alkyl group, provided that at least one of $R_{19}$ to $R_{22}$ is a hydrogen atom, and D is a methylene group, a carbonyl group, a sulfide group, a sulfoxide group or a sulfone group.

Here, the aromatic amine of the formula (6) may, for example, be diaminodiphenylmethane, diaminodiphenylsutfone or diaminodiethyldiphenylmethane. The COOH group-containing acid anhydride may, for example, be trimellitic anhydride or benzophenonetricarboxylic anhydride. When the planarization by heating and fluidizing and the curing reaction are conducted in the same process step employing the planarizing material of the present invention, the balance of the activity of the curing reaction is very important, and for this purpose, selection of the curing catalyst is particularly important. Namely, it is necessary to select a curing catalyst system so that it has a characteristic such that no curing reaction will take place during the heating and fluidizing of the resin, and the curing reaction readily takes place after the heating and fluidizing, and it has a good storage stability. From the foregoing viewpoint, it is preferred to employ a curing catalyst of a photocatalytically acid-generating agent type or a thermally acid-generating agent type which exhibits a catalytic activity after decomposition by heating or irradiation with light. As such a photocatalytically acid-generating agent or thermally acid-generating agent, various onium salt compounds such as an aromatic diazonium salt, a diaryliodonium salt, a triarylsulfonium salt and a triarylselenium salt, a sulfonic acid ester, and a halogen compound, may, for example, be mentioned. Specifically, the aromatic diazonium salt may, for example, be chlorobenzenediazonium hexafluorophosphate, dimethylaminobenzenediazonium hexafluoroantimonate, naphthyldiazonium hexafluorophosphate or dimethylaminonaphthyldiazonium tetrafluoroborate. The diaryliodonium salt may, for example, be diphenyliodoniumtetrafluoroborate, diphenyliodonium hexafluoroantimonate, diphenyliodonium hexafluorophosphate, diphenyliodonium triflate, 4,4'-di-t-butyl-diphenyliodonium triflate, 4,4'-di-t-butyl-diphenyliodonium tetrafluoroborate or 4,4'-di-t-butyl-diphenyliodonium hexafluorophosphate. The triarylsulfonium salt may, for example, be triphenylsulfonium tetrafluoroborate, triphenylsulfonium hexafluorophosphate, triphenylsulfonium hexafluoroantimonate, tri(p-chlorophenyl)sulfonium tetrafluoroborate, tri(p-chlorophenyl)sulfonium hexafluorophosphate, tri(p-chlorophenyl)sulfonium hexafluoroantimonate or 4-t-butyltriphenylsulfonium hexafluorophosphate. The triarylselenium salt may, for example, be triarylselenium tetrafluoroborate, triarylseleniumhexafluorophosphate, triarylselenium hexafluoroantimonate, di(chlorophenyl)phenylselenium tetrafluoroborate, di(chlorophenyl)phenylselenium hexafluorophosphate or di(chlorophenyl)phenylselenium hexafluoroantimonate. The sulfonic acid ester may, for example, be benzoin tosylate, p-nitrobenzyl-9,10-ethoxyanthracene-2-sulfonate, 2-nitrobenzyltosylate, 2,6-dinitrobenzyltosylate or 2,4-dinitrobenzyltosylate. The halogen compound may, for example, be 2-chloro-2-phenylacetophenone, 2,2', 4'-trichloroacetophenone, 2,4,6-tris(trichloromethyl)-s-triazine, 2-(p-methoxystyryl)-4,6-bis (trichloromethyl)-s-triazine, 2-phenyl-4,6-bis (trichloromethyl)-s-triazine, 2-(p-methoxyphenyl)-4,6-bis (trichloromethyl)-s-triazine, 2-(4'-methoxy-1-naphthyl)-4,6-bis(trichloromethyl)-s-triazine, bis-2-(4-chlorophenyl)-1,1,1-trichloroethane, bis-1-(4-chlorophenyl)-2,2,2-trichloroethanol or bis-2(4-methoxyphenyl)-1,1,1-trichloroethane.

Among these curing catalysts, onium salt type compounds are particularly preferred, since the balance of planarization by heating and fluidizing and the activities for the curing reaction, is good, and they can readily be decomposed by various light sources for exposure to exhibit the activities.

Further, from the viewpoint of a particularly important balance of heat-fluidity and heat-curing to obtain a higher level of flatness at a site where stricter flatness is required or at a site having a stepped configuration which is more hardly planarized, more preferred are the following specific sulfonium salts which decompose at relatively high temperatures and then exhibit catalytic activities. Such sulfonium salts are excellent also in the storage stability. They are, for example, benzyl-p-hydroxyphenylmethylsulfonium hexafluorophosphate, p-hydroxyphenyldimethylsulfonium hexafluoroantimonate, p-acetoxyphenyldimethylsulfonium hexafluoroantimonate, benzyl p-hydroxymethylsulfonium hexafluoroantimonate, and a monophenylsulfonium salt type or benzylphenylsulfonium salt type such as a compound of the following formula (8):

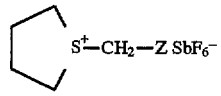

wherein Z is a phenyl group.

The planarizing material of the present invention is composed of the resin capable of having its practical temperature for a planarizing step set at a level lower than 200° C., the heat-curing agent, etc. and has characteristics in the respective materials and their combination. Namely, by the combination of the resin capable of having its practical temperature for a planarizing step set at a level lower than 200° C. and the heat-curing agent, as mentioned above, particularly by the combination of an acrylic resin and a melamine-type heat-curing agent, an acrylic resin and an epoxy-type heat-curing agent, or an acrylic resin, a melamine-type heat-curing agent and an epoxy-type heat-curing agent, it is possible to let the planarization by heating and fluidizing and the curing reaction proceed in the same process step. Therefore, no special curing step is required, which is very advantageous from the viewpoint of the process. Further, the planarizing material of the present invention has excellent transparency for a visible light of at least 400 nm required in the field of the production of charge coupled devices and liquid crystal display devices and is capable of presenting a system wherein the transparency undergoes no change with time even when left to stand under a high temperature condition over a long period of time.

Further, when the planarizing material is required to have a halation-preventing function, a halation-preventive agent having a functional group which will be taken into the system by an addition reaction, is combined with a resin, whereby a halation-preventing function is effectively obtained without evaporation or sublimation even under a high temperature condition during the planarizing/curing step. Further, if a curing catalyst which can be taken into the system by an addition reaction, is used in combination, not only the evaporation and sublimation but also migration can be prevented, and if the above halation-preventive agent is contained, this agent will serve as a cocatalyst, whereby the amount of the curing catalyst can be reduced, such being advantageous.

Further, by adjusting the amounts of the halation-preventive agent and the curing catalyst, the dry etching durability (such as oxygen gas durability) and the refractive index can be controlled, and the heat durability (such as the decomposition property at 250° C.) can be increased. It has been found that the dry etching durability can also be controlled by the copolymerization of the acrylic monomer with an aromatic-containing monomer. However, it can also be controlled by a combination of a polymer of an acrylic monomer (among the polymers of the formulas (1), (3) and (5), those containing no aromatic ring) with the compound of the formula (6). This is epoch-making in that the dry etching durability can be controlled by an inexpensive method. Further, light (incident light, transmitted light) is employed in a solid-state image pick-up device or a liquid crystal display device, and it is also significant from the industrial point of view that the refractive index can be controlled by a simple method.

In the planarizing material of the present invention, the compositional ratios of the resin capable of having its practical temperature for a planarizing step set at a level lower than 200° C., the heat-curing agent and the halation-preventive agent can be changed variously within the ranges where the desired properties can be maintained. However, the heat-curing agent is used usually within a range of from 1 to 50% by weight, preferably from 5 to 30% by weight, relative to the resin and the heat-curing agent, or relative to the resin, the heat-curing agent and the halation-preventive agent. Within this range, good and constant properties can be obtained with respect to the adhesiveness, the transparency, the heat durability and the solvent resistance after curing. The halation-preventive agent is used usually within a range of from 1 to 40% by weight, preferably from 1 to 20% by weight, relative to the resin, the heat-curing agent and the halation-preventive agent. Within this range, an effective halation-preventing function can be imparted while maintaining transparency to a visual light of at least 400 nm required particularly in the field for the production of charge coupled devices and liquid crystal display devices. The amount of the curing catalyst to be used here, is not particularly limited so long as a catalyst system having a good balance of heat-fluidity and heat-curing is employed. The reason is that the catalytic function can readily be satisfied if the catalyst is incorporated in an amount to satisfy the time required for the step of preparing a commercial product.

Further, if necessary, for the purpose of lowering the softening point of the resin and improving the fluidity under heating, various additives including a common plasticizer such as a phthalic acid ester (dimethyl phthalate or dibutyl phthalate), an aromatic carboxylic acid ester (such as trioctyl trimellitate or diethylene glycol dibenzoate), an aliphatic dibasic acid ester (such as dioctyl succinate or dioctyl adipate), an aliphatic ester derivative (such as butyl oleate or methyl acetylricinoleate) or phosphoric acid ester (tricresil or trioctyl), a reactive plasticizer such as diallyl phthalate or a methacrylic acid diester, an acrylic monomer, and a low molecular weight material such as an oligomer, may be incorporated to the planarizing material. Further, in order to improve the flexibility of the cured coating film, various flexibility-imparting agents such as epoxide, polyol, polythiol and silicone compounds, may be incorporated.

The planarizing material of the present invention is usually in the form of a solution having the resin capable of having its practical temperature for a planarizing step set at a level lower than 200° C. and the heat-curing agent dissolved in a suitable solvent so that the resin and the heat-curing agent would be from 10 to 40 parts by weight. Here, the solvent may, for example, be ethylene glycol monoalkyl ethers and acetates thereof, propylene glycol monoalkyl ethers and acetates thereof, diethylene glycol mono- or di-alkyl ethers, ketones such as methyl ethyl ketone, methyl isobutyl ketone and cyclohexanone, acetic acid esters such as ethyl acetate and butyl acetate, aromatic hydrocarbons such as toluene and xylene, ethyl lactate, diacetone alcohol, dimethylacetamide, dimethylformamide, and N-methylpyrrolidone. These solvents may be used alone or in combination as a mixture of two or more of them. Further, in order to improve the coating properties, a surfactant such as a nonionic surfactant, a fluorine-type surfactant or a silicon-type surfactant, may be incorporated, as the case requires. Further, other compatible additives may be incorporated, if necessary.

As described in the foregoing, by coating the planarizing material of the present invention on a substrate having surface irregularities, not only planarization by heating and fluidizing but also heat-curing can be carried out in the same process step, whereby a cumbersome step is not required.

Now, a planarizing method by means of the planarizing material of the present invention will be described.

The planarizing material of the present invention is usually used in the form of a solution. Firstly, predetermined amounts of the resin capable of having its practical temperature for a planarizing step set at a level lower than 200° C. and the heat-curing agent, as well as the curing catalyst and/or the halation-preventive agent, if necessary, are dissolved in the above-mentioned organic solvent, followed by filtration with a filter of 0.2 µm to obtain a solution. Then, the solution of the planarizing material is spin-coated on a substrate having a stepped portion and then heated and fluidized on a hot plate or in an oven to conduct planarization and heat-curing simultaneously. The temperature at that time is not particularly limited so long as it is within a range of from 120° to 250° C. The temperature is preferably from 130 ° to 200° C. Here, a two step baking method may be employed, for example, by conducting planarization by the first baking, followed by heat-curing either for a long curing period at the same temperature or for a short period of time at a higher temperature. Further, when spin-coating is not available, a roll coater method or a printing method may be employed for coating without any problem. After planarization with the material of the present invention, various layers (such as color filter layers) may be formed by patterning by a lithography method on the planarized layer from the necessity of the process, and any stepped portion resulting from the patterning may be likewise planarized with the same planarizing material.

In this planarizing method, the temperature, the time, etc. are not particularly limited and may be suitably adjusted depending upon the particular application.

Now, the present invention will be described in further detail with reference to Examples. However, it should be understood that the present invention is by no means restricted by such specific Examples.

EXAMPLE 1

Into a 1 l four-necked flask, 8.0 g of acrylic acid, 13.5 g of n-butyl acrylate, 28.5 g of methyl methacrylate, 10.0 g of 2,2'-azobisisobutylonitrile (AIBN), 5.0 g of n-dodecylmercaptan and 500 ml of dioxane were charged, dissolved and stirred. Then, stirring was continued under a nitrogen stream at 70° C. for 6 hours. The reaction solution was put into n-hexane to precipitate the resin. Purification with tetrahydrofuran/n-hexane was repeated, followed by vacuum drying at 40° C. to obtain a resin powder. The obtained amount was 43.0 g. The weight average molecular weight as measured by GPC was 15,000 as calculated as polystyrene; the glass transition temperature (Tg) was 53° C.; and the acid value calculated after titration by means of a potentiometer was 60. 25 g of a methacrylic acid/n-butyl acrylate/methyl methacrylate copolymer thus obtained, 4.5 g of a melamine-type heat-curing agent (hexamethoxymethylolmelamine, CYMEL (trademark) 303, manufactured by Mitsui Cyanamid) and 75 g of diethylene glycol dimethyl ether were mixed and dissolved, followed by filtration with a 0.2 μm filter to obtain a planarizing material solution.

A silicon substrate having a silicon dioxide film formed in a thickness of 1 μm, was subjected to photolithography and reactive ion etching to form surface irregularities, and the planarizing material solution was spin-coated on this substrate in a thickness of 2.0 μm, followed by baking at 150° C for 10 minutes on a hot plate to form a planarized film.

The flatness of this planarized film was inspected by means of a contact-type step measuring apparatus (TALY-STEP, trademark), manufactured by Rank Taylor Hobson Company), whereby no substantial irregularities were observed on the planarized film, and planarization was found to be completely done. Further, after the planarized film was formed, a heating test on a hot plate was conducted at 200° C. for 5 minutes, whereby no decrease of the film thickness due to flowing of the planarized layer was observed, and no change of the film surface was observed. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 μm) at 400 nm. No change in this transparency was observed even after the heat treatment on the hot plate at 200° C. for one hour.

EXAMPLE 2

Into a 1 l four-necked flask, 10.0 g of methacrylic acid, 15.0 g of n-butyl acrylate, 25.0 g of methyl methacrylate, 10.0 g of 2,2'-azobis(4-methoxy-2,4-dimethylvaleronitrile), 5.0 g of n-dodecylmercaptan and 500 ml of dioxane were charged, dissolved and stirred. Then, stirring was continued under a nitrogen stream at 70° C. for 6 hours. The reaction solution was put into n-hexane to precipitate the resin. Purification was repeated with tetrahydrofuran/n-hexane, and then vacuum drying was conducted at 40° C. to obtain a resin powder. The obtained amount was 40.0 g. The weight average molecular weight as measured by GPC was 4,000 as calculated as polystyrene; the glass transition temperature (Tg) was 65° C.; and the acid value calculated after titration by means of a potentiometer was 130. 25 g of a methacrylic acid/n-butyl acrylate/methyl methacrylate copolymer thus obtained, 4.5 g of a melamine-type heat-curing agent (CYMEL (trademark) 303, manufactured by Mitsui Cyanamid) and 75 g of diethylene glycol dimethyl ether were mixed and dissolved, followed by filtration with a 0.2 μm filter to obtain a planarizing material solution.

A planarized film was formed in the same manner as in Example 1 except that this planarizing material solution was employed. Further, in the same manner as in Example 1, inspection of the surface was conducted, whereby no irregularities on the planarized film was observed, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 μm) at 400 nm. No change in this transparency was observed even after the heat treatment at 200° C. for one hour.

EXAMPLE 3

Into a 1 l four-necked flask, 10.0 g of hydroxyethyl methacrylate, 40.0 g of isobutyl methacrylate, 10.0 g of 2,2'-azobisisobutylnitrile (AIBN), 5.0 g of n-dodecylmercaptan and 500 ml of dioxane were charged, dissolved and stirred. Then, stirring was continued under a nitrogen stream at 70° C. for 6 hours. The reaction solution was put into n-hexane to precipitate the resin. Purification was repeated with tetrahydrofuran/n-hexane, and then vacuum drying was conducted at 40° C. to obtain a resin powder. The obtained amount was 40.0 g. The weight average molecular weight as measured by GPC was 16,000 as calculated as polystyrene; the glass transition temperature (Tg) was 59° C.; and the acid value calculated after titration by means of a potentiometer was 110. 25 g of a hydroxyethyl methacrylate/isobutyl methacrylate copolymer thus obtained, 4.4 g of a melamine-type heat-curing agent (CYMEL (trademark) 303, manufactured by Mitsui Cyanamid) and 83 g of ethyl lactate were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.5% (thickness: 1 μm) at 400 nm. No change in this transparency was observed even after the heat treatment at 200° C. for one hour.

EXAMPLE 4

25 g of an acrylic acid/n-butyl acrylate/methyl methacrylate copolymer (weight average molecular weight: 1,000 as measured by GPC and as calculated as polystyrene, AW-36, manufactured by Seiko Kagaku Kogyo), 4.4 g of a melamine-type heat-curing agent (CYMEL (trademark) 303, manufactured by Mitsui Cyanamid) and 83 g of ethyl lactate were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.5% (thickness: 1 μm) at 400 nm. No change in this transparency was observed even after the heat treatment at 200° C. for one hour.

EXAMPLE 5

Into a 1 l four-necked flask, 25.0 g of glycidyl methacrylate, 25.0 g of methyl methacrylate, 10.0 g of 2,2'-azobis(4-methoxy-2,4-dimethylavleronitrile), 5.0 g of n-dodecylmercaptan and 500 ml of dioxane were charged, dissolved and stirred. Then, stirring was continued under a nitrogen stream at 70° C. for 4 hours. The reaction solution was put into methanol to precipitate the resin. Purification with tetrahydrofuran/methanol was repeated, and then vacuum drying was conducted at 40° C. to obtain a resin powder. The obtained amount was 40.0 g. The weight average molecular weight as measured by GPC was 16,000 as calculated as polystyrene; the glass transition temperature (Tg) was 63° C.; and the epoxy equivalent was 210. 25 g of a glycidyl methacrylate/methyl methacrylate copolymer thus obtained, 6.5 g of an epoxy-type heat-curing agent (a polyfunctional glycidyl ether, EX-611, manufactured by Nagase Chemicals Ltd.), 1.6 g of a curing catalyst (a sulfonium salt type thermally acid-generating agent), SI-190, manufactured by Shanshin Chemical Industry Co., Ltd.) and 77 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface toughening was observed when immersed in a solvent such as water, isopropyl alcohol, trichloroethane or xylene. Further, the transparency of the planarized layer in a visible light region was excellent, and, for example, it was 99.0% (thickness: 1 μm) at 400 nm. No change in this transparency was observed even after the heat treatment at 200° C. for one hour.

EXAMPLE 6

Into a 1 l four-necked flask, 25.0 g of glycidyl methacrylate, 25.0 g of n-butyl methacrylate, 10.0 g of 2,2'-azobis(4-methoxy-2,4-dimethylvaleronitrile), 5.0 g of n-dodecylmercaptan and 500 ml of dioxane were charged, dissolved and stirred. Then, stirring was continued under a nitrogen stream at 70° C. for 4 hours. The reaction solution was put into methanol to precipitate the resin. Purification was repeated with tetrahydrofuran/methanol, and then vacuum drying was conducted at 40° C. to obtain a resin powder. The obtained amount was 38.0 g. The weight average molecular weight as measured by GPC was 14,000 as calculated as polystyrene; the glass transition temperature (Tg) was 33° C.; and the epoxy equivalent was 205. 25 g of a glycidyl methacrylate/n-butyl methacrylate copolymer thus obtained, 6.5 g of an epoxy-type heat-curing agent (EX-611, manufactured by Nagase Chemicals Ltd.), 1.6 g of a curing catalyst (SI-190, manufactured by Shanshin Chemical Industry Co., Ltd.) and 77 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 99.0% (thickness: 1 μm) at 400 nm. No change in this transparency was observed even after the heat treatment at 200° C. for one hour.

EXAMPLE 7

25 g of a glycidyl methacrylate/n-butyl methacrylate copolymer obtained in the same manner as in Example 6, 5.8 g of an epoxy-type heat-curing agent (a polyfunctional alicyclic epoxy, Celloxide 2021P, manufactured by Daisel Kagaku Kogyo), 1.5 g of a curing catalyst (SI-190, manufactured by Shanshin Chemical Industry Co., Ltd.) and 75.5 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 99.0% (thickness: 1 μm) at 400 nm. No change in this transparency was observed even after the heat treatment at 200° C. for one hour.

EXAMPLE 8

Into a 1 l four-necked flask, 50.0 g of glycidyl methacrylate, 10.0 g of 2,2'-azobisisobutylnitrile (AIBN), 5.0 g of n-dodecylmercaptan and 500 ml of dioxane were charged, dissolved and stirred. Then, stirring was continued under a nitrogen stream at 70° C. for 4 hours. The reaction solution was put into methanol to precipitate the resin. Purification was repeated with tetrahydrofuran/methanol, and then vacuum drying was conducted at 40° C. to obtain a resin powder. The obtained amount was 40.5 g. The weight average molecular weight as measured by GPC was 18,000 as calculated as polystyrene; the glass transition temperature (Tg) was 40° C.; and the the epoxy equivalent was 155. 25 g of a glycidyl methacrylate polymer thus obtained, 6.5 g of an epoxy-type heat-curing agent (EX-611, manufactured by Nagase Chemicals Ltd.), 1.6 g of a curing catalyst (SI-190, manufactured by Shanshin Chemical Industry Co., Ltd.) and 65 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.7% (thickness: 1 μm) at 400 nm. No change in this transparency was observed even after the heat treatment at 200° C. for one hour.

EXAMPLE 9

25 g of a glycidyl methacrylate polymer (weight average molecular weight: 11300 as measured by GPC and as calculated as polystyrene, epoxy equivalent: 168, Marp Roof U-100, manufactured by Nippon Oil and Fats Co., Ltd.), 6.5 g of an epoxy-type heat-curing agent (EX-611, manufactured by Nagase Chemicals Ltd.), 1.6 g of a curing catalyst (SI-190, manufactured by Shanshin Chemical Industry Co., Ltd.) and 65 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.5% (thickness: 1 μm) at 400 nm. No change in this transparency was observed even after the heat treatment at 200° C. for one hour.

EXAMPLE 10

25 g of a methacrylic acid/n-butyl acrylate/methyl methacrylate copolymer obtained in the same manner as in Example 1, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 99.0% (thickness: 1 μm) at 400 nm. No change in this transparency was observed even after the heat treatment at 200° C. for one hour.

EXAMPLE 11

25 g of a methacrylic acid/n-butyl acrylate/methyl methacrylate copolymer obtained in the same manner as in Example 1, 2.0 g of a melamine-type heat-curing agent (CYMEL (trademark) 303, manufactured by Mitsui Cyanamid), 3.0 g of an epoxy-type heat-curing agent (Celloxide 2021P, manufactured by Daisel Chemical Industries), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.5% (thickness: 1 μm) at 400 nm. No change in this transparency was observed even after the heat treatment at 200° C. for one hour.

EXAMPLE 12

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 2.0 g of a curing catalyst (3,3'-diaminodiphenylsulfone) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 μm) at 400 nm. No change in this transparency was observed even after the heat treatment at 200° C. for one hour.

Further, for the study of storage stability, the change in viscosity at room temperature was examined, whereby no substantial increase in viscosity was observed even after being left at room temperature for 30 days, whereby excellent storage stability was confirmed.

EXAMPLE 13

25 g of a glycidyl methacrylate/n-butyl methacrylate copolymer obtained in the same manner as in Example 6, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 2.0 g of a curing catalyst (3,3'-diaminodiphenylsulfone) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.5% (thickness: 1 μm) at 400 nm. No change in this transparency was observed even after the heat treatment at 200° C. for one hour.

EXAMPLE 14

25 g of a glycidyl methacrylate/n-butyl methacrylate copolymer obtained in the same manner as in Example 6, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.5% (thickness: 1 μm) at 400 nm. No change in this transparency was observed even after the heat treatment at 200° C. for one hour.

EXAMPLE 15

25 g of a glycidyl methacrylate/n-butyl methacrylate copolymer obtained in the same manner as in Example 6, 2.0 g of a melamine-type heat-curing agent (CYMEL (trademark) 303, manufactured by Mitsui Cyanamid), 3.0 g of an epoxy-type heat-curing agent (Celloxide 2021P, manufactured by Daisel Chemical Industries), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 μm) at 400 nm. No change in this transparency was observed even after the heat treatment at 200° C. for one hour.

EXAMPLE 16

25 g of a glycidyl methacrylate/n-butyl methacrylate copolymer obtained in the same manner as in Example 6, 2.0 g of a melamine-type heat-curing agent (CYMEL (trademark) 303, manufactured by Mitsui Cyanamid), 3.0 g of an epoxy-type heat-curing agent (Celloxide 2021P, manufactured by Daisel Chemical Industries) and 72 g of diethylene glycol dimethyl ether were mixed and dissolved, followed by filtration with a 0.2 μm filter to obtain a planarizing material solution.

On a substrate having a stepped portion obtained in the same manner as in Example 1, this planarizing material solution was spin-coated in a thickness of 2.0 μm and baked at 160° C. for 30 minutes on a hot plate to form a planarized film.

The flatness of this planarized film was inspected by means of a contact-type step measuring apparatus (TALYSTEP (trademark), manufactured by Rank Taylor Hobson Company), whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 μm) at 400 nm. No change in this transparency was observed even after the heat treatment at 200° C. for one hour.

EXAMPLE 17

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 0.15 g of a curing catalyst (SI-190, manufactured by Shanshin Chemical Industry Co., Ltd.), 1.5 g of a halation-preventive agent (2,2', 4,4'-tetrahydroxybenzophenone) and 65 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 96.0% (thickness: 1 μm) at 400 nm. No change in this transparency was observed even after the heat treatment at 200° C. for one hour.

Further, as shown in FIG. 1, a sufficient absorption was observed in the i-line region, and no substantial change in the spectral characteristics was observed even after the heat treatment for one hour.

Figure 2:
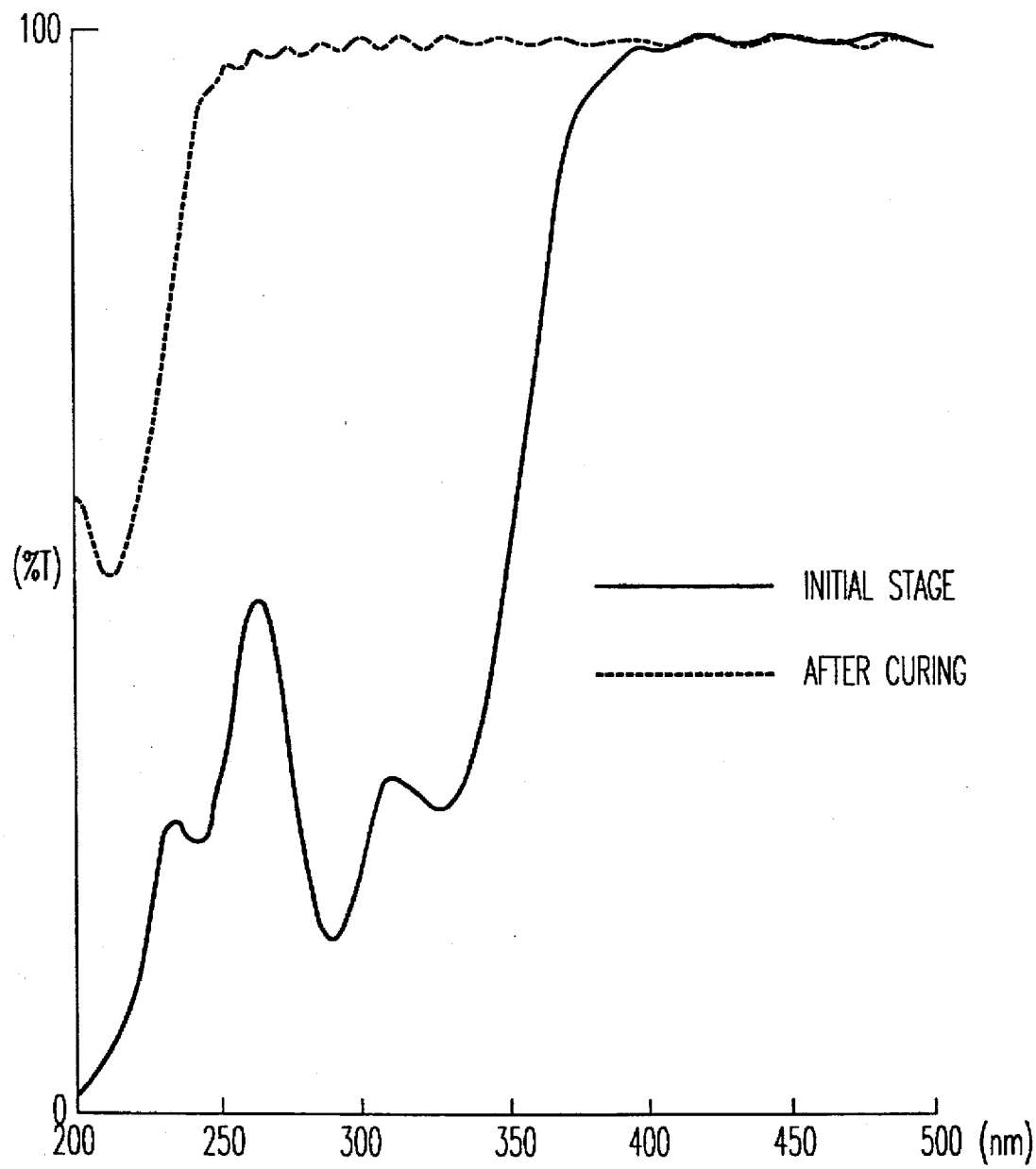
FIG. 2 is a graph showing similar spectral characteristics in a case where 2-hydroxy-4-methoxybenzophenone was used instead of 2,2', 4,4'-tetrahydroxybenzopheone.

On the other hand, FIG. 2 shows spectral characteristics in a case where the operation was conducted in the same manner except that 2-hydroxy-4-methoxybenzophenone was used instead of 2,2', 4,4'-tetrahydroxybenzophenone. As a result, with 2-hydroxy-4-methoxybenzophenone, sublimation and dissipation took place in a short period of time by the heat treatment, and it was impossible to maintain satisfactory spectral characteristics, since it did not have a functional group effective for an addition reaction, although a sufficient absorption was observed in the i-line region. Thus, a halation-preventive agent having no functional group effective for an addition reaction can be used only for an application where the heat treatment is conducted at a relatively low temperature.

Figure 3:
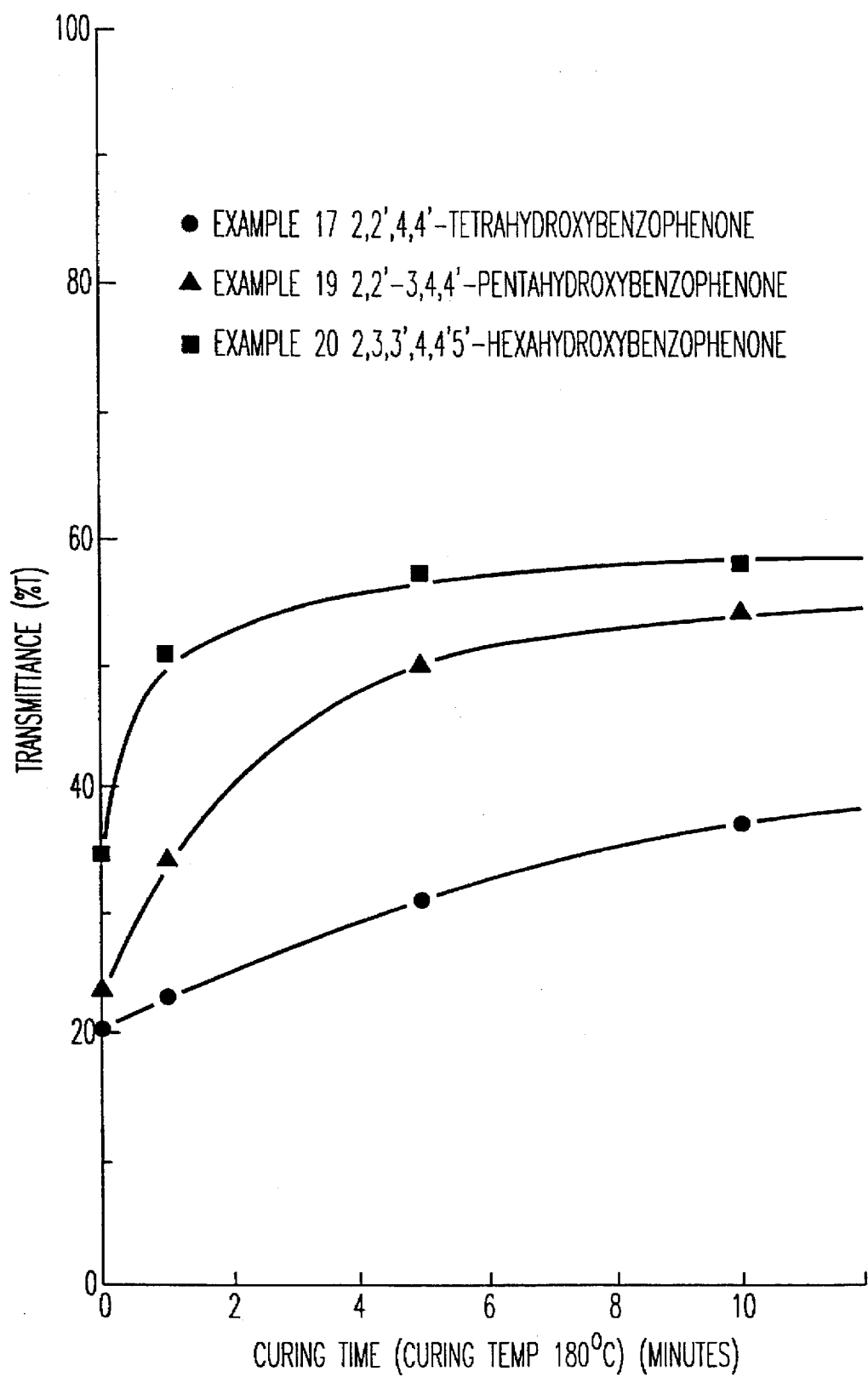
FIG. 3 is a graph showing the change in the transmittance with the curing time with respect to the planarizing materials of Examples 17, 19 and 20.

Further, evaluation of spectral characteristics was conducted with respect to a planarizing material wherein 2,2', 4,4'-tetrahydroxybenzophenone was used as the halation-preventive agent. FIG. 3 shows the change of the transmittance with the curing time.

Further, the storage stability was studied in the same manner as in Example 12, whereby no substantial increase of the viscosity was observed even after being left at room temperature for 30 days, whereby excellent storage stability was confirmed.

EXAMPLE 17

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 0.15 g of a curing catalyst (SI-190, manufactured by Shahshin Chemical industry Co., Ltd.), 1.5 g of a halation-preventive agent (2,2', 4,4'-tetrahydroxybenzophenone) and 65 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 96.0% (thickness: 1 µm) at 400 nm. No change in this transparency was observed even after the heat treatment at 200° C. for one hour.

EXAMPLE 18

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 0.7 g of a curing catalyst (3,3'-diaminodiphenylsulfone), 1.5 g of a halation-preventive agent (2,2', 4,4'-tetrahydroxybenzophenone) and 65 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.5% (thickness: 1 µm) at 400 nm. No change in this transparency was observed even after the heat treatment at 200° C. for one hour.

Further, an adequate adsorption was observed in the i-line region, and no substantial change in the spectral characteristics was observed even after the heat treatment for one hour.

Further, in the same manner as in Example 12, the storage stability was studied, whereby no substantial increase in viscosity was observed after being left at room temperature for 30 days, whereby excellent storage stability was confirmed.

EXAMPLES 19 AND 20

Evaluation of the spectral characteristics was conducted in the same manner as in Example 17 using the same planarizing material except that as the halation-preventive agent, 2,2', 3,4,4'-pentahydroxybenzophenone (Example 19) and 2,3,3', 4,4', 5'-hexahydroxybenzophenone (Example 20) were used. FIG. 3 shows the changes of the transmittance of the planarizing materials of Examples 19 and 20 with the curing time.

EXAMPLE 21

Figure 4:
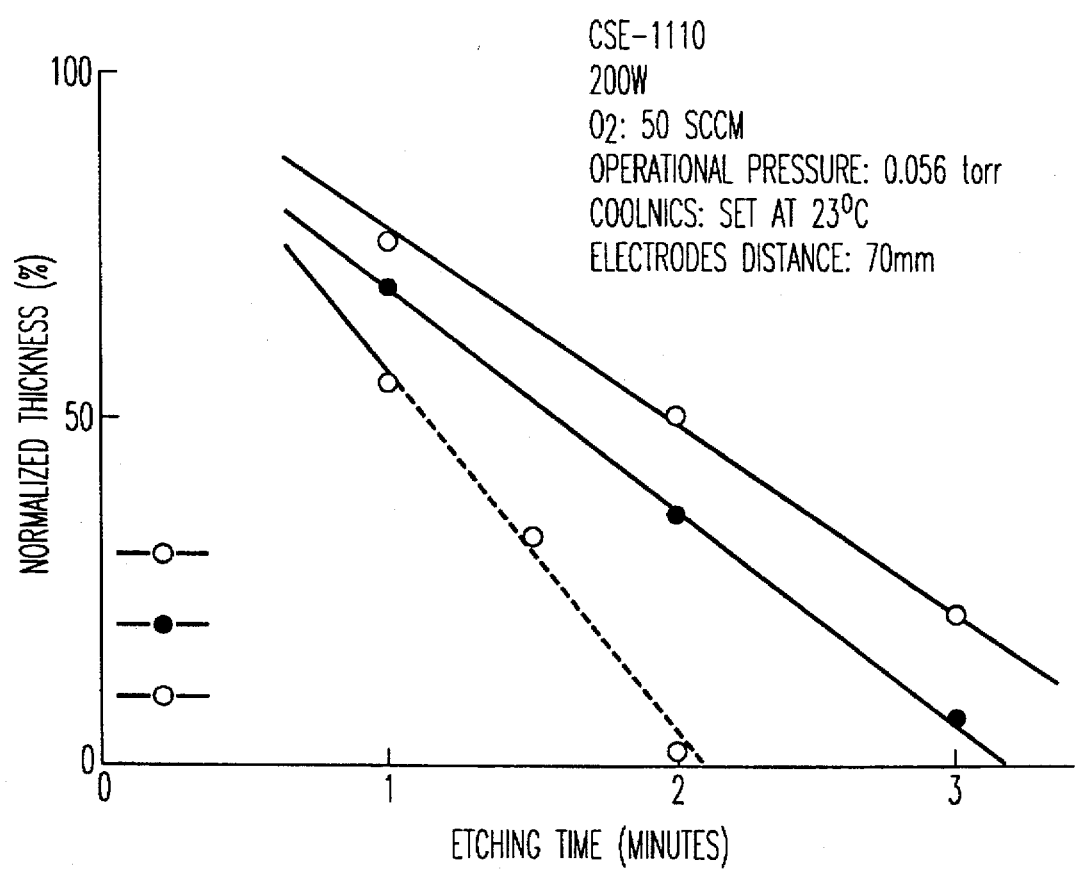
FIG. 4 is a graph showing the results of evaluation of dry etching durability of the planarized films formed in Examples 6, 21 and 22.

A planarizing material solution prepared in the same manner as in Example 12 was spin-coated on a silicon substrate and then baked at 150° C. for 10 minutes on a hot plate to form a planarized film having a thickness of 2.0 µm. The dry etching durability of this planarized film was evaluated by means of a dry etching apparatus (CSE-1110 (trademark), manufactured by ULVAC corp.). The results of the evaluation are shown in FIG. 4.

EXAMPLE 22

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 5.0 g of a curing catalyst (3,3'-diaminodiphenylsulfone) and 72 g of diethylene glycol dimethyl ether were mixed and dissolved, followed by filtration with a 0.2 µm filter to obtain a planarizing material solution.

On a silicon substrate, this planarizing material solution was spin-coated and then baked at 150° C. for 10 minutes on a hot plate to form a planarized film having a thickness of 2.0 µm. The dry etching durability of this planarized film was evaluated by means of a dry etching apparatus (CSE-1110 (trademark), manufactured by ULVAC corp.). The results of the evaluation and the results of a comparative test conducted by using a planarizing material solution prepared in the same manner as in Example 6, are shown in FIG. 4.

From the evaluation results, the dry etching durability imparted by the addition of the curing catalyst (3,3'-diaminodiphenylsulfone) was confirmed.

EXAMPLE 23

Figure 5:
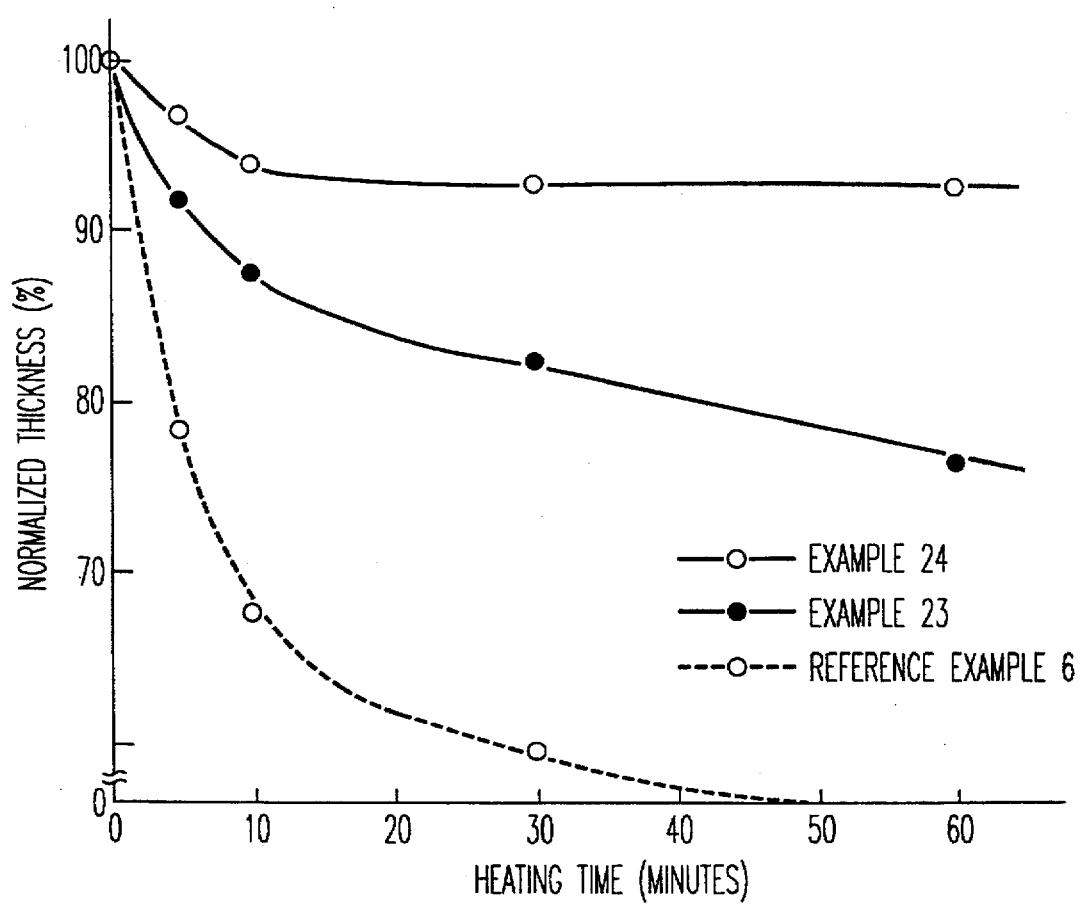
FIG. 5 is a graph showing the results of heat durability tests of the planarized films formed in Examples 23 and 24 and Reference Example 6.

A planarizing material solution prepared in the same manner as in Example 12 was spin-coated on a silicon substrate and then baked at 150° C. for 10 minutes on a hot plate to form a planarized film having a thickness of 2.0 µm. This planarized film was heated on a hot plate of 250° C., whereby shrinkage of the film was inspected, and evaluation of the heat durability under a high temperature, was conducted. The evaluation results are shown in FIG. 5.

EXAMPLE 24

A planarizing material solution prepared in the same manner as in Example 22, was spin-coated on a silicon substrate and then baked at 150° C. for 10 minutes on a hot plate to form a planarized film having a thickness of 2.0 µm. This planarized film was heated on a hot plate of 250° C., whereby shrinkage of the film was inspected, and evaluation of the heat durability under a high temperature, was conducted. The evaluation results are shown in FIG. 5. From the evaluation results, the heat durability imparted by the addition of the curing catalyst (3,3'-diaminodiphenylsulfone) was confirmed.

EXAMPLE 25

25 g of a methacrylic acid/n-butyl acrylate/methyl methacrylate copolymer obtained in the same manner as in Example 1, 4.5 g of hexamethoxymethylolmelamine (CYMEL (trademark) 303, manufactured by Mitsui Cyanamid), 5.0 g of a curing catalyst (trimellitic anhydride) and 65 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 96.0% (thickness: 1 µm) at 400 nm. No change in this transparency was observed even after the heat treatment at 200° C. for one hour.

EXAMPLE 26

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 5.0 g of a curing catalyst (trimellitic anhydride) and 65 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.5% (thickness: 1 µm) at 400 nm. No change in this transparency was observed even after the heat treatment at 200° C. for one hour.

EXAMPLE 27

25 g of a glycidyl methacrylate/n-butyl methacrylate copolymer obtained in the same manner as in Example 6, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 5.0 g of a curing catalyst (trimellitic anhydride) and 72 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface toughening was observed when immersed in a solvent such as water, isopropyl alcohol, trichloroethane or xylene. Further, the transparency of the planarized layer in a visible light region was excellent, and, for example, it was 95.3% (thickness: 1 µm) at 400 nm. No change in this transparency was observed even after the heat treatment at 200° C. for one hour.

EXAMPLE 28

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), curing catalysts (0.7 g of 3,3'-diaminodiphenylsulfone and 0.5 g of trimellitic anhydride) and 72 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.2% (thickness: 1 µm) at 400 nm. No change in this transparency was observed even after the heat treatment at 200° C. for one hour.

EXAMPLE 29

25 g of a glycidyl methacrylate polymer obtained in the same manner as in Example 8, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.2% (thickness: 1 µm) at 400 nm. No change in this transparency was observed even after the heat treatment at 200° C. for one hour.

EXAMPLE 30

25 g of a glycidyl methacrylate polymer obtained in the same manner as in Example 8, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (3,3'-diaminodiphenylsulfone) and 65 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.2% (thickness: 1 µm) at 400 nm. No change in this transparency was observed even after the heat treatment at 200° C. for one hour.

EXAMPLE 31

25 g of a glycidyl methacrylate polymer obtained in the same manner as in Example 8, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), curing catalysts (0.7 g of 3,3'-diaminodiphenylsulfone, and 5.0 g of trimellitic anhydride) and 72 g of ethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.4% (thickness: 1 µm) at 400 nm. No change in this transparency was observed even after the heat treatment at 200° C. for one hour.

EXAMPLE 32

25 g of a glycidyl methacrylate polymer obtained in the same manner as in Example 8, 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of ethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 µm) at 400 nm. No change in this transparency was observed even after the heat treatment at 200° C. for one hour.

EXAMPLE 33

25 g of a glycidyl methacrylate polymer obtained in the same manner as in Example 8, 3.0 g of an epoxy-type heat-curing agent (EX-611, manufactured by Nagase Chemicals Ltd.), 0.7 g of a curing catalyst (3,3'-diaminodiphenylsulfone) and 65 g of ethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.6% (thickness: 1 µm) at 400 nm. No change in this transparency was observed even after the heat treatment at 200° C. for one hour.

EXAMPLE 34

25 g of a glycidyl methacrylate polymer obtained in the same manner as in Example 8, 3.0 g of an epoxy-type heat-curing agent (EX-611, manufactured by Nagase Chemicals Ltd.), 5.0 g of a curing catalyst (trimellitic anhydride) and 72 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 96.0% (thickness: 1 µm) at 400 nm. No change in this transparency was observed even after the heat treatment at 200° C. for one hour.

EXAMPLE 35

Into a 1 l four-necked flask, 25.0 g of epoxycyclohexylmethyl acrylate, 25.0 g of n-butyl methacrylate, 10.0 g of 2,2'-azobisisobutylonitrile (AIBN), 5.0 g of n-dodecylmercapatne and 500 ml of dioxane were charged, dissolved and stirred. Then, stirring was continued under a nitrogen stream at 70° C. for 4 hours. The reaction solution was put into methanol to precipitate the resin. Purification with tetrahydrofuran/methanol was repeated, and then vacuum drying was conducted at 40° C. to obtain a resin powder. The obtained amount was 36.5 g. The weight average molecular weight as measured by GPC was 20,000, as calculated as polystyrene; the glass transition temperature (Tg) was 30° C.; and the epoxy equivalent was 198. 25 g of an epoxycyclohexylmethyl acrylate/n-butyl methacrylate copolymer thus obtained, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 µm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.0% (thickness: 1 μm) at 400 nm. No change in this transparency was observed even after the heat treatment at 200° C. for one hour.

EXAMPLE 36

25 g of an epoxycyclohexylmethyl acrylate/n-butyl methacrylate copolymer obtained in the same manner as in Example 35, 2.5 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (3,3'-diaminodiphenylsulfone) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.0% (thickness: 1 μm) at 400 nm. No change in this transparency was observed even after the heat treatment at 200° C. for one hour.

EXAMPLE 37

25 g of an epoxycyclohexylmethyl acrylate/n-butyl methacrylate copolymer obtained in the same manner as in Example 35, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (3,3'-diaminodiphenylsulfone) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.3% (thickness: 1 μm) at 400 nm. No change in this transparency was observed even after the heat treatment at 200° C. for one hour.

EXAMPLE 38

25 g of an epoxycyclohexylmethyl acrylate/n-butyl methacrylate copolymer obtained in the same manner as in Example 35, 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 5.0 g of a curing catalyst (trimellitic anhydride) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.5% (thickness: 1 μm) at 400 nm. No change in this transparency was observed even after the heat treatment at 200° C. for one hour.

EXAMPLE 39

25 g of an epoxycyclohexylmethyl acrylate/n-butyl methacrylate copolymer obtained in the same manner as in Example 35, 3.0 g of an epoxy-type heat-curing agent (EX-611, manufactured by Nagase Chemicals Ltd.), 0.7 g of a curing catalyst (SI-190, manufactured by Shahshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 98.3% (thickness: 1 μm) at 400 nm. No change in this transparency was observed even after the heat treatment at 200° C. for one hour.

EXAMPLE 40

25 g of an epoxycyclohexylmethyl acrylate/n-butyl methacrylate copolymer obtained in the same manner as in Example 35, 3.0 g of an epoxy-type heat-curing agent (EX-611, manufactured by Nagase Chemicals Ltd.), 0.7 g of a curing catalyst (3,3'-diaminodiphenylsulfone) and 65 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.4% (thickness: 1 μm) at 400 nm. No change in this transparency was observed even after the heat treatment at 200° C. for one hour.

EXAMPLE 41

25 g of an epoxycyclohexylmethyl acrylate/n-butyl methacrylate copolymer obtained in the same manner as in Example 35, 3.0 g of an epoxy-type heat-curing agent (EX-611, manufactured by Nagase Chemicals Ltd.), 5.0 g of a curing catalyst (trimellitic anhydride) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 95.7% (thickness: 1 μm) at 400 nm. No change in this transparency was observed even after the heat treatment at 200° C. for one hour.

EXAMPLES 42 TO 45

25 g of a glycidyl methacrylate polymer obtained in the same manner as in Example 8, an epoxy-type heat-curing agent (EX-611, manufactured by Nagase Chemicals Ltd.), a curing catalyst (3,3'-diaminodiphenylsulfone) and diethylene glycol dimethyl ether were mixed to have the composition as identified in Table 1 and dissolved, followed by filtration with a 0.2 μm filter to obtain a planarizing material solution.

TABLE 1

| | Composition | | | | Refractive index (coating film) |
|---|---|---|---|---|---|
| | Resin | Heat curing agent | Curing catalyst | Sovlent | |
| Example 42 | PGMA[1] 25.0 g | EX-611 3.0 g | DAS[2] 1.2 g | Diglyme[3] 68.0 g | 1.48 |
| Example 43 | PGMA 25.0 g | EX-611 3.0 g | DAS 2.1 g | Diglyme 70.0 g | 1.50 |
| Example 44 | PGMA 25.0 g | EX-611 3.0 g | DAS 3.1 g | Diglyme 73.0 g | 1.51 |
| Example 45 | PGMA 25.0 g | EX-611 3.0 g | DAS 6.2 g | Diglyme 80.0 g | 1.52 |
| Reference Example 5 | PGMA 25.0 g | EX-611 3.0 g | SI-190 0.7 g | Diglyme 65.0 g | 1.46 |

[1]PGMA: Polyglycidyl methacrylate
[2]DAS: 3,3'-diaminodiphenylsulfone
[3]Diglyme: Diethylene glycol dimethyl ether Each of these planarizing material solutions was spin-coated on a silicon substrate and baked at 150° C. for 10 minutes on a hot plate to form a planarized film having a thickness of 2.0 μm.

Figure 6:
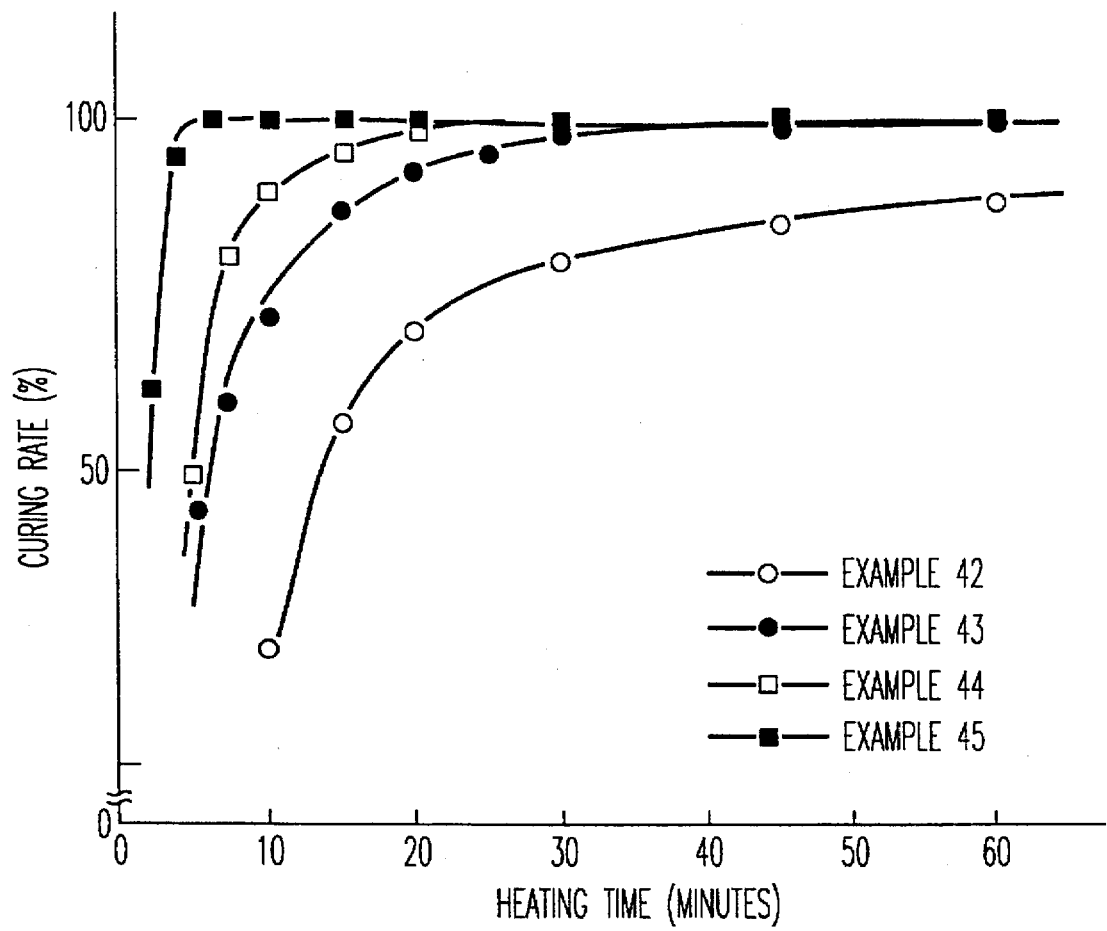
FIG. 6 is a graph showing the curing characteristics of the planarizing materials of Examples 42 to 45.

The curing properties of the respective planarizing materials are shown in FIG. 6, and the refractive indices are shown in Table 1.

From the results, it was confirmed that by an addition of the curing catalyst (3,3'-diaminodiphenylsulfone), the refractive index and the curing time can suitably be selected.

EXAMPLE 46

A planarizing material solution prepared in the same manner as in Example 12 was spin-coated on an Al-Si substrate and then baked at 150° C. for 10 minutes on a hot plate to form a planarized film having a thickness of 2.0 μm.

This planarized film was subjected to a moisture durability test in a temperature and moisture tester (PR-2G, manufactured by TABAI) at a temperature of 85° C. and under a humidity of 85%. No substantial change was observed on the substrate surface and the planarized film even upon expiration of 1,000 hours under such an environment.

EXAMPLE 47

A planarizing material solution prepared in the same manner as in Example 27 was spin-coated on a silicon substrate and then baked at a high temperature of 200° C. of the curing catalyst for 10 minutes on a hot plate to form a planarized film having a thickness of 2.0 μm.

The surface of this planarized film was inspected in the same manner as in Example 1, whereby no substantial irregularities were observed on the planarized film, and planarization was found to be completely done. With respect to the solvent resistance, surface toughening which is observed if the curing is inadequate, was not observed when immersed in a solvent such as water, isopropyl alcohol, trichloroethane or xylene. Thus, it was confirmed that the curing catalyst effectively functioned without undergoing evaporation or sublimation.

EXAMPLES 48 TO 50

25 g of a glycidyl methacrylate polymer obtained in the same manner as in Example 8, an epoxy-type heat-curing agent (EX-611, manufactured by Nagase Chemicals Ltd.), a curing catalyst (SI-190, manufactured by Shanshin Chemical Industry Co., Ltd.) and diethylene glycol dimethyl ether were mixed to have the composition as identified in Table 2 and dissolved, followed by filtration with a 0.2 μm filter to obtain a planarizing material solution.

TABLE 2

| | Composition | | | | |
|---|---|---|---|---|---|
| | Resin | Heat curing agent | Curing catalyst | Halation-preventive agent | Sovlent |
| Example 48 | PGMA[1] 25.0 g | EX-611 3.0 g | SI-190 1.47 g | THBP[2] 1.55 g | Diglyme[3] 68 g |
| Example 49 | PGMA 25.0 g | EX-611 3.0 g | SI-190 0.28 g | THBP 1.48 g | Diglyme[3] 70 g |
| Example 50 | PGMA 25.0 g | EX-611 3.0 g | SI-190 0.14 g | THBP 1.48 g | Diglyme[3] 73 g |

[1]PGMA: Polyglycidyl methacrylate
[2]THBP: 2,2',4,4'-tetrahydroxybenzophenone
[3]Diglyme: Diethylene glycol dimethyl ether Each of these planarizing material solutions was spin-coated on a silicon substrate and then baked at 150° C. for from 1 to 30 minutes on a hot plate to form a planarized film having a thickness of 2.0 μm.

Figure 7:
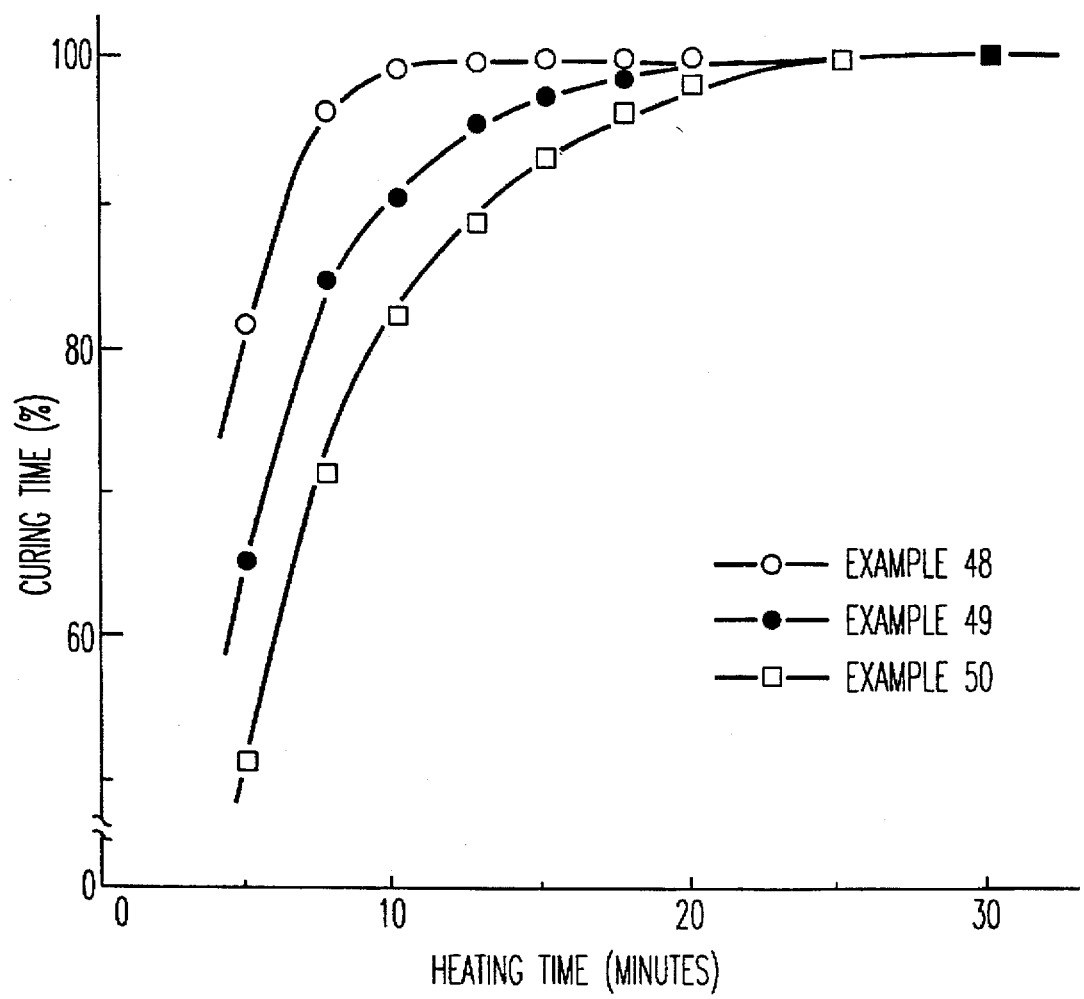
FIG. 7 is a graph showing the curing characteristics of the planarizing materials of Examples 48 to 50.

The planarized film thus obtained was immersed in methyl ethyl ketone for 5 minutes, and the curing characteristics were evaluated by the change in the film thickness before and after the immersion. The results of the evaluation are shown in FIG. 7.

Further, with respect to each planarizing material solution, a planarized film was formed in the same manner as in Example 1 except that the baking condition was changed as described above, and inspection of the surface was conducted in the same manner as in Example 1, whereby no substantial irregularities were observed on each planarized film, and planarization was found to be completely done in each case. With respect to the solvent resistance, no surface roughening was observed with respect to a planarized film having a film-remaining ratio of more than 85% when immersed in a solvent such as water, isopropyl alcohol, trichloroethane or xylene. Further, the transparency of each planarized layer in a visible light region was excellent, and, for example, it was from 95.0 to 96.5% (thickness: 1 μm) at 400 nm. No change in this transparency was observed even after the heat treatment at 200° C. for one hour.

Further, in each case of the above curing conditions, a sufficient absorption was observed in the i-line region, and no substantial change in the spectral characteristics attributable to evaporation or sublimation of the halation-preventive agent, was observed, even after the heat treatment for one hour. Thus, it was confirmed that a wide range of process conditions ranging from a low temperature to a high temperature or ranging from a short period of time to a long period of time, can be selected.

EXAMPLE 51

Figure 8:
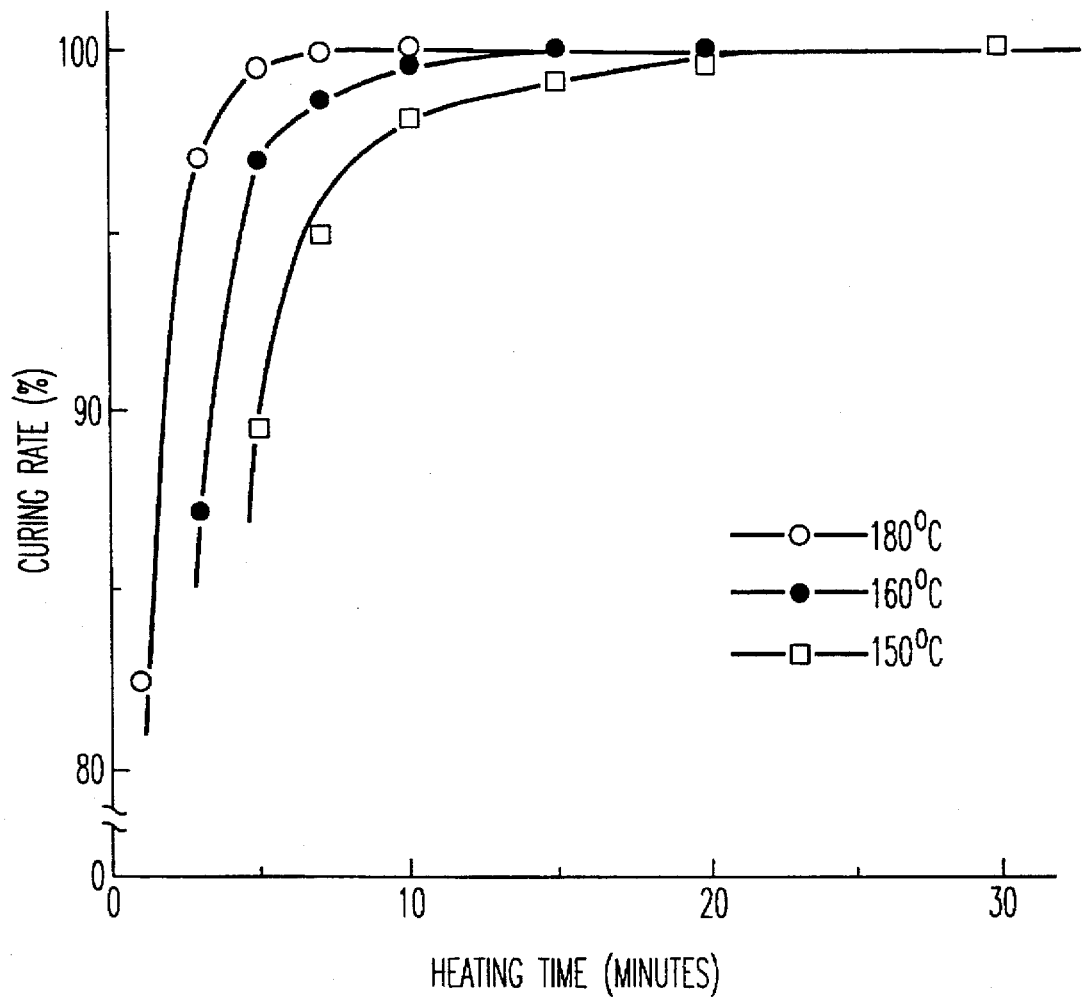
FIG. 8 is a graph showing the curing characteristics of the planarizing material of Example 51 when cured at various temperatures.

A planarizing material solution prepared in the same manner as in Example 17 was spin-coated on a silicon substrate and then baked within a temperature range from 150° C. to 180° C. for a curing time of from 1 to 30 minutes on a hot plate to form a planarized film having a thickness of 2.0 μm. The planarized film thus obtained was immersed in methyl ethyl ketone for 5 minutes, and the curing characteristics were evaluated from the change in the film thickness before and after the immersion. The results of the evaluation are shown in FIG. 8.

Further, a planarized film was formed in the same manner as in Example 1 except that the baking condition was changed as described above, and in the same manner as in Example 1, inspection of the surface was conducted, whereby no substantial irregularities were observed on the planarized film, and planarization was found to be completely done. With respect to the solvent resistance, no surface roughening was observed with a planarized film having a film remaining ratio of more than 85% when immersed in a solvent such as water, isopropyl alcohol, trichloroethane or xylene. Further, the transparency of the planarized layer in a visible light region was excellent, and, for example, it was from 95.0 to 96.5% (thickness: 1 μm) at 400 nm. No change in this transparency was observed even after the heat treatment at 200° C. for one hour. Further, in each case of the above curing conditions, a sufficient absorption was observed in the i-line region, and no substantial change in the spectral characteristics attributable to evaporation or sublimation of the halation-preventive agent, was observed even after the heat treatment for one hour. Thus, it was confirmed that a wide range of process conditions ranging from a low temperature to a high temperature, or ranging from a short period of time to a long period of time, can be selected.

EXAMPLE 52

25 g of a cresol novolak-type epoxy resin (EOCN-1028, manufactured by Nippon Kayaku), 4.5 g of a melamine-type heat-curing agent (CYMEL (trademark) 303, manufactured by Mitsui Cyanamid), 0.7 g of a curing catalyst (SI-190, manufactured by Shanshin Chemical Industry Co., Ltd.) and 75 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 97.0% (thickness: 1 μm) at 400 nm. Further, the transparency of this planarized layer after the heat treatment at 200° C. for one hour, was 91.5% (thickness: 1 μm).

EXAMPLE 53

25 g of a cresol novolak-type epoxy resin (EOCN-1028, manufactured by Nippon Kayaku), 6.5 g of an epoxy-type heat-curing agent (EX-611, manufactured by Nagase Chemicals Ltd.), 1.6 g of a curing catalyst (SI-190, manufactured by Shanshin Chemical Industry Co., Ltd.) and 65 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 96.5% (thickness: 1 μm) at 400 nm. Further, the transparency of this planarized layer after the heat treatment at 200° C. for one hour, was 93.5% (thickness: 1 μm).

EXAMPLE 54

25 g of a cresol novolak-type epoxy resin (EOCN-1028, manufactured by Nippon Kayaku), 2.0 g of a melamine-type heat-curing agent (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. Further, in the same manner as in Example 1, inspection of the surface was conducted, whereby no substantial irregularities were observed on the planarized film, and planarization was found to be completely done. With respect to the solvent resistance, no surface roughening was observed when immersed in a solvent such as water, isopropyl alcohol, trichloroethane or xylene. Further, the transparency of the planarized layer in a visible light region was excellent, and, for example, it was 96.5% (thickness: 1 μm) at 400 nm. Further, the transparency of this planarized layer after the heat treatment at 200° C. for one hour, was 93.0% (thickness: 1 μm).

REFERENCE EXAMPLE 1

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 0.7 g of a curing catalyst (1,8-diazabicyclo(5,4,0)undecane (DBU)) and 72 g of diethylene glycol dimethyl ether were mixed and dissolved, followed by filtration with a 0.2 μm filter to obtain a planarizing material solution.

Then, the storage stability was studied in the same manner as in Example 17. As a result, with respect to the curing catalyst stored in a refrigerator, no substantial increase in the viscosity (thickening) was observed on the 14th day after the initiation of the study and it was possible to use it without trouble. On the other hand, with respect to the curing catalyst stored at room temperature, the planarizing material solution was completely cured upon expiration of 7 days, and it was impossible to use it.

REFERENCE EXAMPLE 2

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 0.7 g of a curing catalyst (1-isobutyl-2-methylimidazole) and 72 g of diethylene glycol dimethyl ether were mixed and dissolved, followed by filtration with a 0.2 μm filter to obtain a planarizing material solution.

Then, the storage stability was studied in the same manner as in Example 17. As a result, with respect to the curing catalyst stored in a refrigerator, no substantial increase in the viscosity (thickening) was observed on the 30th day after the initiation of the study, and it was possible to use it without any problem. On the other hand, with respect to the curing catalyst stored at room temperature, on the 7th day after the initiation, film forming was conducted under the same coating conditions as at the initial stage, whereby the film thickness increased by about two times, thus indicating a distinct increase of the viscosity.

REFERENCE EXAMPLE 3

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 7.0 g of a curing catalyst (phthalic anhydride) and 72 g of diethylene glycol dimethyl ether were mixed and dissolved, followed by filtration with a 0.2 μm filter to obtain a planarizing material solution.

Then, a planarized film was formed in the same manner as in Example 46.

Further, in the same manner as in Example 1, inspection of the surface was conducted, whereby no substantial irregularities were observed on the planarized film, and planarization was. found to be completely done. With respect to the solvent resistance, no surface roughening was observed when immersed in a solvent such as water, isopropyl alcohol, trichloroethane or xylene.

On the other hand, formation of the planarized film was conducted by changing the conditions for forming a planarized film to 200° C. for 5 minutes, whereby a decrease in the film thickness due to flowing of the planarized layer was observed, although the formation of the planarized film was good. Further, also with respect to the solvent resistance, surface roughening and dissolution of the coating film were observed when immersed in a solvent such as isopropyl alcohol, trichloroethane or xylene.

Further, by the IR (infrared absorption spectrum) measurement, absorption at 1,780 $cm^{-1}$ and 1,830–1,860 $cm^{-1}$ attributable to a carbonyl group of an anhydride ring was examined before and after the curing treatment, whereby the absorption was found to decrease substantially, while no new absorption or shift attributable to the curing reaction was found to appear. Thus, evaporation or sublimation of the curing catalyst during the curing treatment was confirmed.

REFERENCE EXAMPLE 4

25 g of a glycidyl methacrylate/n-butyl methacrylate copolymer obtained in the same manner as in Example 6, 3.0 g of an epoxy-type heat-curing agent (EX-611, manufactured by Nagase Chemicals Ltd.), 0.7 g of a curing catalyst (1-isobutyl-2-methylimidazole) and 72 g of diethylene glycol dimethyl ether were mixed and dissolved, followed by filtration with a 0.2 μm filter to obtain a planarizing material solution. Then, a moisture-durability test was conducted in the same manner as in Example 39. Upon expiration of 1,000 hours, the surface was observed, whereby formation of many voids and a color change were observed on an Al-Si substrate although no substantial change was observed on a silicon substrate.

REFERENCE EXAMPLE 5

25 g of a glycidyl methacrylate polymer obtained in the same manner as in Example 8, 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 65 g of diethylene glycol dimethyl ether were mixed and dissolved, followed by filtration with a 0.2 μm filter to obtain a planarizing material solution.

This planarizing material solution was spin-coated on a silicon substrate and then baked at 150° C. for 10 minutes on a hot plate to form a planarized film having a thickness of 2.0 μm.

The refractive index of this planarized film was measured in the same manner as in Examples 42 to 45. The results are shown in Table 1.

REFERENCE EXAMPLE 6

A planarizing material solution prepared in the same manner as in Example 9 was spin-coated on a silicon substrate and then baked at 150° C. for 10 minutes on a hot plate to form a planarized film having a thickness of 2.0 μm.

This planarized film was subjected to a heat durability test under a high temperature in the same manner as in Example 23. The results are shown in FIG. 5.

COMPARATIVE EXAMLE 1

Into a 1 l four-necked flask, 24.5 g of methacrylic acid, 12.0 g of n-butyl methacrylate, 13.5 g of methyl methacrylate, 4.0 g of 2,2'-azobisisobutylonitrile (AIBN) and 500 ml of dioxane were charged, dissolved and stirred. Then, stirring was continued under a nitrogen stream at 70° C. for 6 hours. The reaction solution was put into methanol to precipitate the resin. Purification was repeated with tetrahydrofuran/methanol, and then vacuum drying was conducted at 40° C. to obtain a resin powder. The obtained amount was 42.0 g. The weight average molecular Weight as measured by GPC was 260,000 as calculated as polystyrene; the glass transition temperature (Tg) was 145° C.; and the acid value calculated after titration by a potentiometer was 351. 25 g of a methacrylic acid/n-butyl acrylate/methyl methacrylate copolymer having a high molecular weight and a high Tg, thus obtained, 4.4 g of hexamethoxymethylolmelamine (CYMEL (trademark) 303, manufactured by Mitsui Cyanamid) and 83 g of ethyl lactate were mixed and dissolved, followed by filtration with a 0.2 μm filter to obtain a planarizing material solution.

A planarized film was formed in the same manner as in Example 1 except that this planarizing material solution was used. However, even after the planarizing step, a level difference of from 1.0 to 1.5 μm remained, and desired flatness was not obtained. The same evaluation was attempted by raising the baking temperature, but the level difference of the same degree still remained and desired flatness was not obtained, although a certain improvement was observed.

COMPARATIVE EXAMPLE 2

25 g of a methacrylic acid/n-butyl acrylate/methyl methacrylate copolymer obtained in the same manner as in Comparative Example 1, 6.5 g of an epoxy-type heat-curing agent (EX-611, manufactured by Nagase Chemicals Ltd.), 1.6 g of a curing catalyst (SI-190, manufactured by Shanshin Chemical Industry Co., Ltd.) and 77 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. However, even after the planarizing step, a level difference of from 1.0 to 1.5 μm remained, and desired flatness was not obtained. Further, the same evaluation was attempted by raising the baking temperature, but the level difference of the same degree still remained, and desired flatness was not obtained, although a certain improvement was observed.

COMPARATIVE EXAMPLE 3

25 g of a methacrylic acid/n-butyl acrylate/methyl methacrylate copolymer obtained in the same manner as in Comparative Example 1, 2.0 g of hexamethoxymethylolmelamine (CYMEL (trademark) 303, manufactured by Mitsui Cyanamid), 3.0 g of an epoxy-type heat-curing agent (EX-611, manufactured by Nagase Chemicals Ltd.), 0.7 g of a curing catalyst (SI-190, manufactured by Shanshin Chemical Industry Co., Ltd.) and 72 g of diethylene glycol dimethyl ether were mixed and dissolved, followed by filtration with a 0.2 μm filter to obtain a planarizing material solution.

A planarized film was formed in the same manner as in Example 1 except that this planarizing material solution was used. However, even after the planarizing step, a level difference of from 1.0 to 1.5 μm remained, and desired flatness was not obtained. Further, the same evaluation was attempted by raising the baking temperature, but the level difference of the same degree still remained, and desired flatness was not obtained, although a certain improvement was observed.

COMPARATIVE EXAMPLE 4

A planarized film was formed in the same manner as in Example 1 except that a heat-curing agent (a melamine-type heat-curing agent or an epoxy-type heat-curing agent) was not incorporated. Formation of a planarized film was good, but when the planarized film was subjected to a heating test at 200° C. for 5 minutes on a hot plate, a decrease in the film thickness due to flowing of the planarized layer, was observed. Further, also with respect to the solvent resistance, surface roughening, swelling and a change in the film thickness were observed when immersed in a solvent such as isopropyl alcohol, trichloroethane or xylene.

As is apparent from the foregoing description, the planarizing material of the present invention comprising a resin capable of having its practical temperature for a planarizing step set at a level lower than 200° C., a heat-curing agent, etc., has heat durability and solvent resistance and is capable of presenting a high level of flatness. Further, if a halation-preventing function is required for the planarizing material, by a combination of the resin with a halation-preventive agent having a functional group so that it is taken into the system by an addition reaction, a halation-preventing function can effectively be obtained without evaporation or sublimation even under a high temperature during the planarizing/curing step. Further, the planarizing material of the present invention has a feature that it has excellent transparency to a visible light of at least 400 nm.

On the other hand, the planarizing method using the planarizing material of the present invention can be a simple method having the cumbersomeness of conventional process steps reduced and thus has a merit that the productivity can thereby be improved.

Thus, the planarizing material and the planarizing method of the present invention is useful for the production of charge coupled devices with highly densified picture elements, liquid crystal display devices or semiconductor integrated circuits.

What is claimed is:

1. A method for planarizing a substrate having surface irregularities, which comprises coating a planarizing material on a substrate having surface irregularities to form a film, followed by heating to fluidize and heat-cure the film, wherein the planarizing material comprises:

a homopolymer or a copolymer polymerized from at least one monomer selected from the group consisting of a (meth) acrylic monomer, a styrene monomer and a vinyl alcohol monomer as the main component in a polymer;

a heat-curing agent selected from the group consisting of a melamine heat-curing agent, an epoxy heat-curing agent and a mixture thereof; and a halation-preventive agent having a functional group reactive for an addition reaction with at least one of said homopolymer or copolymer, said heat-curing agent and the halation-preventive agent.

2. The planarizing method according to claim 1, wherein said monomer is a (meth) acrylic monomer comprising structural units of the following formula (1), and the heat-curing agent is a melamine heat-curing agent comprising structural units of the following formula (2) or an epoxy heat-curing agent:

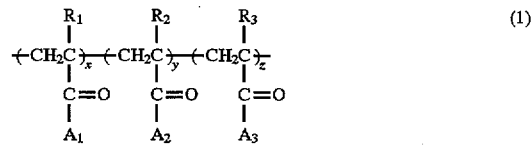

wherein each of $R_1$, $R_2$ and $R_3$ is hydrogen or a methyl group, each of $A_1$, $A_2$ and $A_3$ is $OB_1$ or $NB_2B_3$, wherein each of $B_1$, $B_2$ and $B_3$ is hydrogen, a $C_{1-6}$ alkyl, alkenyl or hydroxyalkyl group, a $C_{2-12}$ epoxy group, a $C_{6-12}$ aryl group or a $C_{7-12}$ aralkyl group, and each of x, y and z is a positive number inclusive of 0 and they satisfy the following formulas:

$0 \leq x/(x+y+z) \leq 1$ $0 \leq y/(x+y+z) \leq 1$ $0 \leq z/(x+y+z) \leq 1$

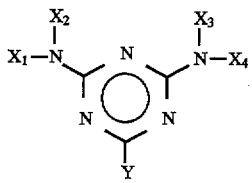 (2)

wherein Y is $-NX_5X_6$ or a phenyl group, and each of $X_1$ to $X_6$ is hydrogen or $-CH_2OZ$, wherein Z is hydrogen or a $C_{1-5}$ alkyl group.

3. The planarizing method according to claim 1, wherein said monomer is a (meth) acrylic monomer comprising structural units of the following formula (3) or (4), the heat-curing agent is a melamine heat-curing agent comprising structural units of the following formula (2) or an epoxy heat-curing agent, and the halation-preventive agent is a benzophenone compound comprising structural units of the following formula (5):

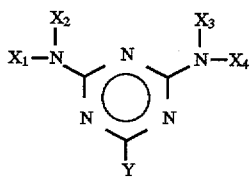 (2)

wherein Y is $-NX_5X_6$ or a phenyl group, and each of $X_1$ to $X_6$ is hydrogen or $-CH_2OZ$, wherein Z is hydrogen or a $C_{1-5}$ alkyl group,

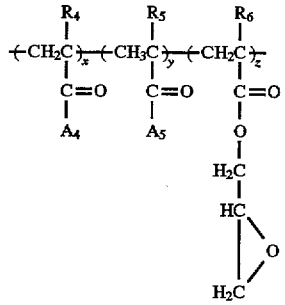 (3)

wherein each of $R_4$, $R_5$ and $R_6$ is hydrogen or a methyl group, and each of $A_4$ and $A_5$ is $OB_4$ or $NB_5B_6$, wherein each of $B_4$, $B_5$ and $B_6$ is hydrogen, a $C_{1-6}$ alkyl, alkenyl or hydroxyalkyl group, a $C_{2-12}$ epoxy group, a $C_{6-12}$ aryl group or a $C_{7-12}$ aralkyl group, and each of x, y and z is a positive number inclusive of 0 and they satisfy the following formulas:

$0 \leq x/(x+y+z) \leq 1$ $0 \leq y/(x+y+z) \leq 1$ $0 \leq z/(x+y+z) \leq 1$

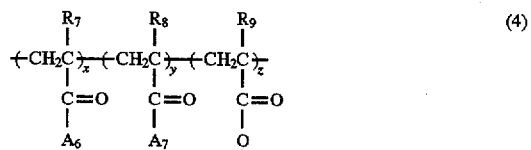 (4)

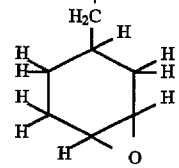

wherein each of $R_7$, $R_8$ and $R_9$ is hydrogen or a methyl group, each of $A_6$ and $A_7$ is $OB_7$ or $NB_8B_9$, wherein each of $B_7$, $B_8$ and $B_9$ is hydrogen, a $C_{1-6}$ alkyl, alkenyl or hydroxyalkyl group, a $C_{2-12}$ epoxy group, a $C_{6-12}$ aryl group or a $C_{7-12}$ aralkyl group, and each of x, y and z is a positive number inclusive of 0 and they satisfy the following formulas:

$0 \leq x/(x+y+z) \leq 1$ $0 \leq y/(x+y+z) \leq 1$ $0 \leq z/(x+y+z) \leq 1$

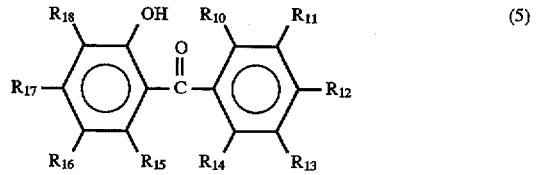 (5)

wherein each of $R_{10}$ to $R_{18}$ is hydrogen or $-OW$, wherein W is hydrogen or a $C_{1-6}$ alkyl group, provided that at least one of $R_{10}$ to $R_{18}$ is $-OH$.

4. The planarizing method according to claim 1, wherein the planarizing material further contains an acid-generating curing catalyst which exhibits a catalytic activity.

5. The planarizing method according to claim 4, wherein the curing catalyst is an onium salt compound.

6. The planarizing method according to claim 1, wherein the planarizing material is in the form of a solution having the planarizing material dissolved in a solvent.

7. A method for planarizing a substrate having surface irregularities, which comprises coating a planarizing material on a substrate having surface irregularities to form a film, followed by heating to fluidize and heat-cure the film, wherein the planarizing material consists essentially of:

a resin selected from the group consisting of an acrylic resin, a styrene resin and a polyvinyl alcohol;

a heat-curing agent selected from the group consisting of a melamine heat-curing agent, an epoxy heat-curing agent and mixtures thereof; and a halation-preventive agent having a functional group reactive for an addition reaction with at least one of said resin and said heat-curing agent.

8. The planarizing method according to claim 2, 3, 1, or 7, wherein the planarizing material further contains a curing catalyst which exhibits a catalytic activity under heating and which has a functional group reactive for an addition reaction with at least one of said resin, said heat-curing agent, said halation-preventive agent and the curing catalyst.

9. The planarizing method according to claim 8, wherein the curing catalyst is an aromatic amine of the following formula (6) or an acid anhydride having at least one —COOH group or a mixture thereof:

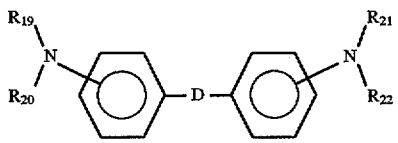

(6)

wherein each of $R_{19}$ to $R_{21}$ is hydrogen or a $C_{1-5}$ alkyl group, provided that at least one of $R_{19}$ to $R_{21}$ is hydrogen, and D is a methylene group, a carbonyl group, a sulfide group, a sulfoxide group or a sulfone group.

10. The planarizing method of claim 7, said resin having a glass transition temperature of 65° C. or lower.

11. The planarizing method according to claim 2, wherein the planarizing material is in the form of a solution having the planarizing material dissolved in a solvent.

12. The planarizing method according to claim 1, wherein the planarizing material is in the form of a solution having the planarizing material didsolved in a solvent.

13. The planarizing method according to claim 3, wherein the planarizing material is in the form of a solution having the planarizing material dissolved in a solvent.

14. The planarizing method according to claim 9, wherein the planarizing material is in the form of a solution having the planarizing material dissolved in a solvent.

15. The planarizing method according to claim 4, wherein the planarizing material is in the form of a solution having the planarizing material dissolved in a solvent.

16. The planarizing method according to claim 5, wherein the planarizing material is in the form of a solution having the planarizing material dissolved in a solvent.

17. The planarizing method according to claim 8, wherein wherein the planarizing material is in the form of a solution having the planarizing material dissolved in a solvent.

18. The planarizing method according to claim 7, wherein the planarizing material is in the form of a solution having the planarizing material dissolved in a solvent.

19. The planarizing method according to claim 8, wherein the curing catalyst is an aromatic amine of the following formula (6) or an acid anhydride having at least one —COOH group or a mixture thereof:

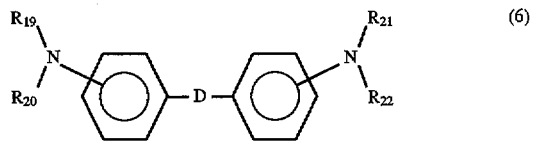

(6)

wherein each of $R_{19}$ to $R_{21}$ is hydrogen or a $C_{1-5}$ alkyl group, provided that at least one of $R_{19}$ to $R_{21}$ is hydrogen, and D is a methylene group, a carbonyl group, a sulfide group, a sulfoxide group or a sulfone group.

20. The planarizing method of claim 7, wherein said resin has a property of being able to planarize the substrate at a temperature lower than 200° C.

* * * * *